US007630634B1

(12) United States Patent
Boduch

(10) Patent No.: US 7,630,634 B1
(45) Date of Patent: Dec. 8, 2009

(54) METHOD AND APPARATUS FOR MANAGING AN OPTICAL SIGNAL

(75) Inventor: Mark E. Boduch, Geneva, IL (US)

(73) Assignee: Tellab Operations, Inc., Naperville, IL (US)

(*) Notice: Subject to any disclaimer, the term of this patent is extended or adjusted under 35 U.S.C. 154(b) by 654 days.

(21) Appl. No.: 11/319,338

(22) Filed: Dec. 27, 2005

Related U.S. Application Data

(60) Provisional application No. 60/692,994, filed on Jun. 22, 2005.

(51) Int. Cl.
*H04B 10/08* (2006.01)
*H04B 10/02* (2006.01)

(52) U.S. Cl. .................. 398/30; 398/25; 398/31; 398/33; 398/34; 398/181

(58) Field of Classification Search .................. 398/9, 398/12, 19, 22, 25, 51, 54, 30, 31, 33, 34, 398/181
See application file for complete search history.

(56) References Cited

U.S. PATENT DOCUMENTS 5,500,756 A * 3/1996 Tsushima et al. .......... 398/181
5,864,414 A * 1/1999 Barnsley et al. ............ 398/71
6,868,201 B1 3/2005 Johnson et al.
2002/0057577 A1 5/2002 Rocca et al.
2004/0028407 A1 * 2/2004 Noheji ..................... 398/59
2005/0281558 A1 12/2005 Wang et al.

FOREIGN PATENT DOCUMENTS

EP 1 202 595 A1 5/2002
EP 1 434 374 A1 6/2004

OTHER PUBLICATIONS

PCT International Search Report in PCT/US2007/015441 mailed on Jun. 6, 2008.

* cited by examiner

*Primary Examiner*—Dalzid Singh
(74) *Attorney, Agent, or Firm*—Hamilton, Brook, Smith & Reynolds, P.C.

(57) ABSTRACT

A node for managing an optical signal includes a first system optics card for providing channels to be transported over a first optical transport link and receives channels from a second optical transport link. Channels received over the second optical transport link are provided to an optical converter card for transport to a client device, for feedback onto the first optical transport link, or pass through to a second system optics card of the node. The first system optics card is capable of dropping network channels from the second transport link to associated client devices through optical converter cards and add client channels received from optical converter cards to the first transport link. The first system optics card may include one or more express input and output ports to couple with one or more other system optics cards in order to provide multiple degrees of communication capability.

26 Claims, 16 Drawing Sheets

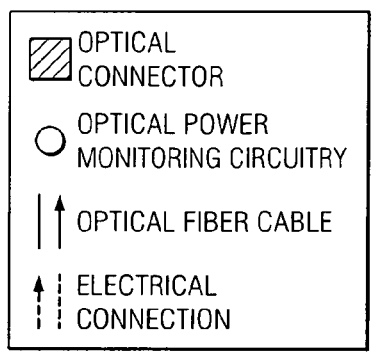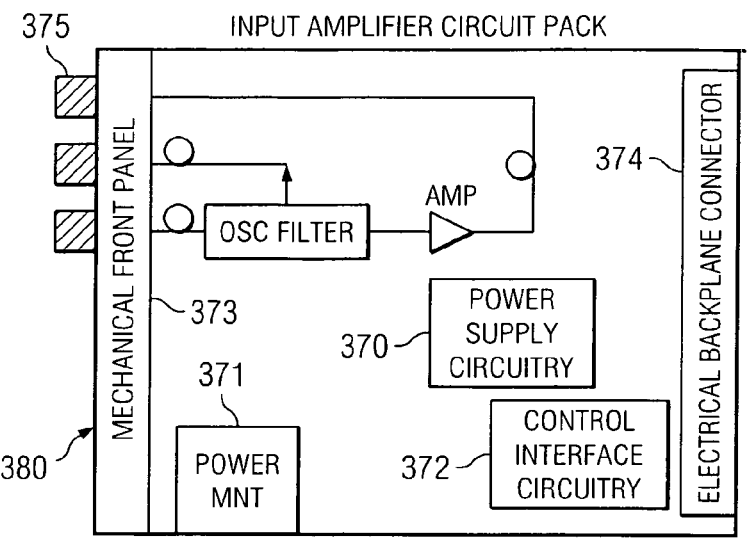
FIG. 3A
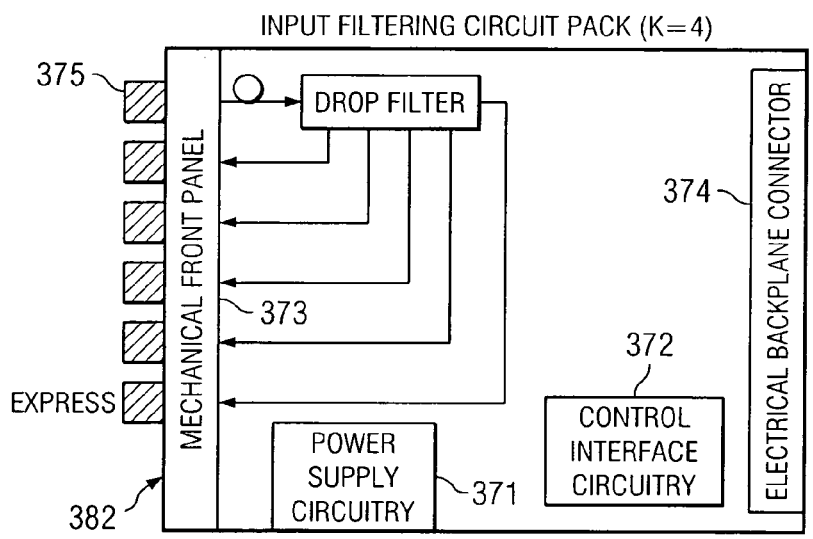
FIG. 3B
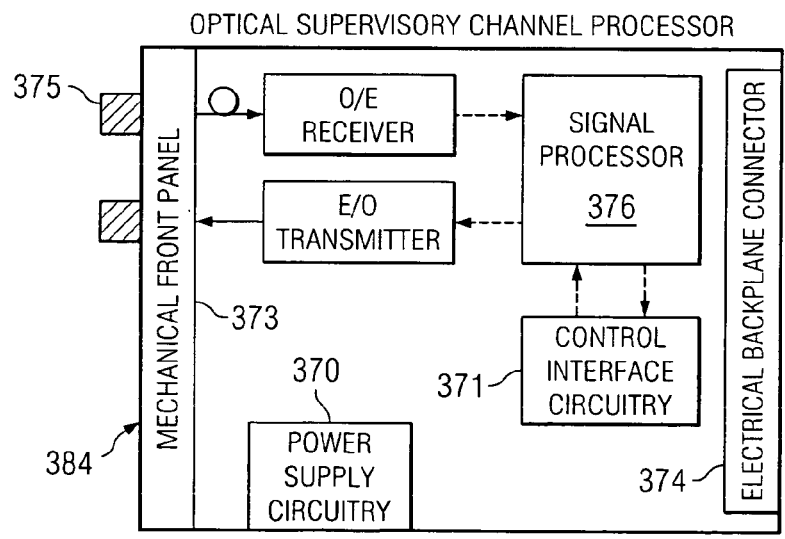
FIG. 3C

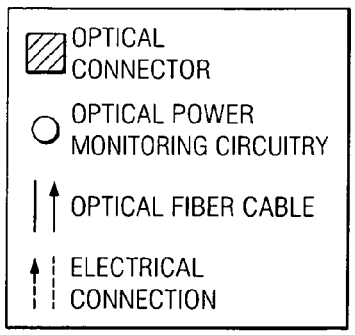
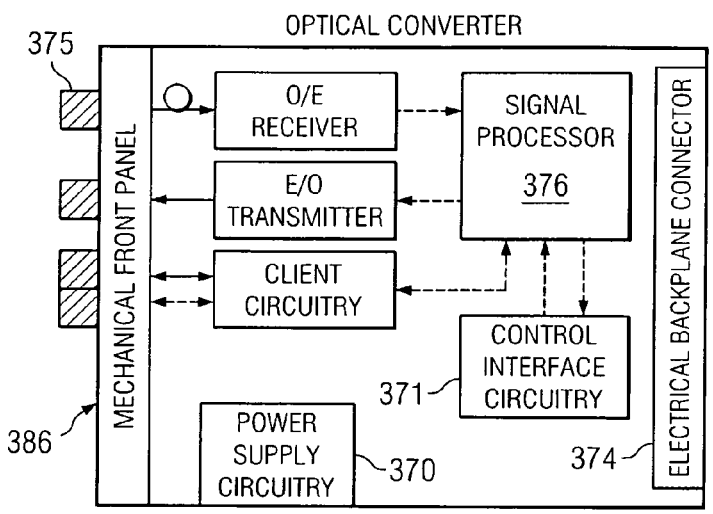
*FIG. 3D*
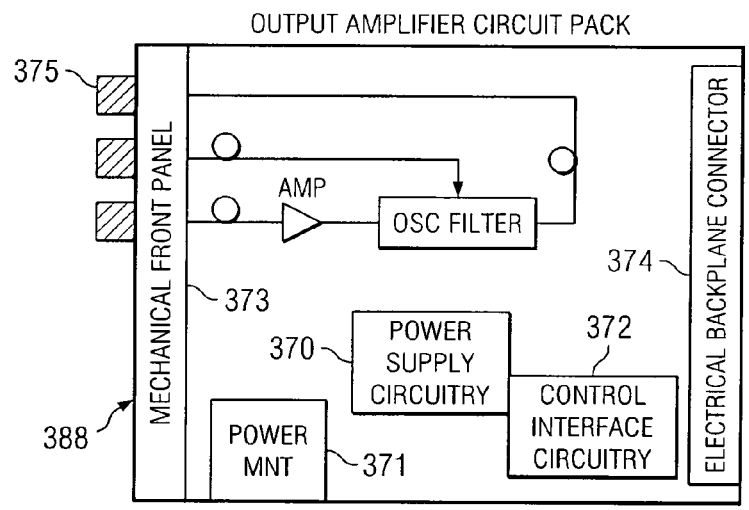
*FIG. 3E*
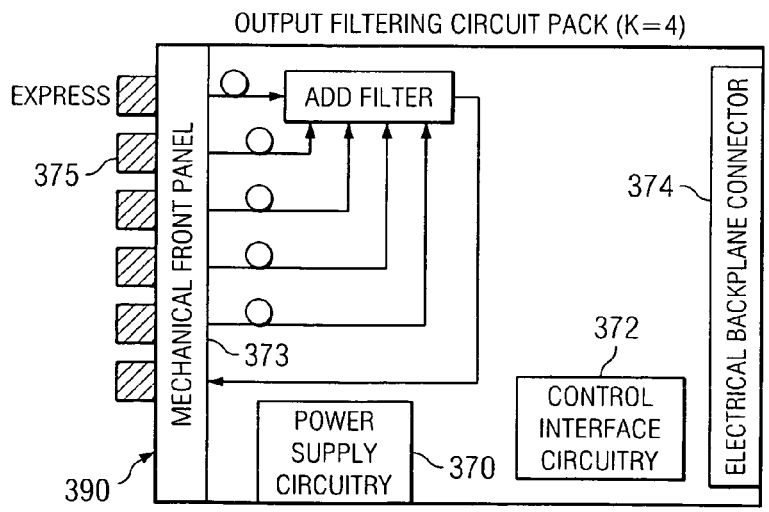
*FIG. 3F*

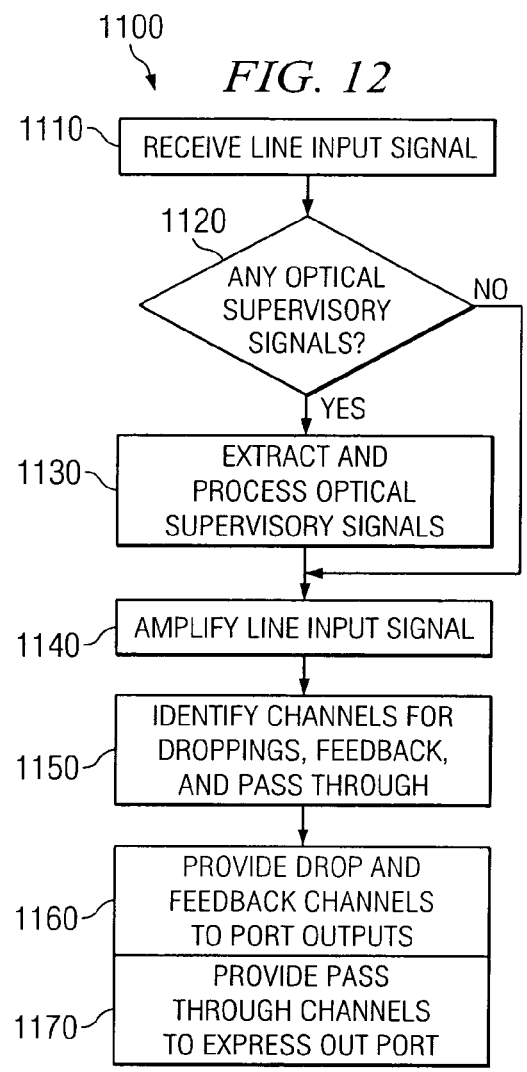
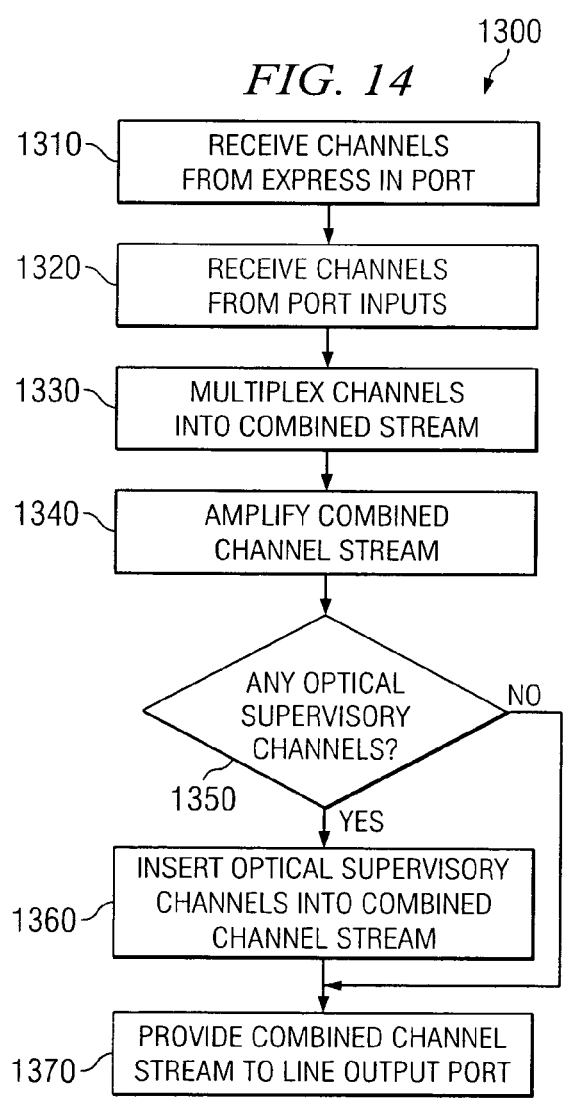

METHOD AND APPARATUS FOR MANAGING AN OPTICAL SIGNAL

RELATED APPLICATIONS

This application claims the benefit of U.S. Provisional Application Ser. No. 60/692,994 filed Jun. 22, 2005.

TECHNICAL FIELD OF THE INVENTION

This invention relates in general to the field of wavelength division multiplexing and more particularly to a method and apparatus for managing an optical signal.

BACKGROUND OF THE INVENTION

Wavelength Division Multiplexing (WDM) and Dense Wavelength Division Multiplexing (DWDM) are technologies that enable a multitude of optical wavelengths of differing frequencies to be transported over a single optical fiber. A DWDM network is constructed by interconnecting multiple DWDM network elements. Each network element typically contains functions such as optical multiplexing equipment (filtering), optical de-multiplexing equipment (filtering), optical amplifiers, optical power monitors, optical supervisory channel processors, network element control processors, and optical converters. In existing DWDM network elements, each individual function within the network element was placed on individual circuit packs. Each circuit pack then had to be plugged into a common backplane which supplied power and control to each circuit pack. In order to construct a working DWDM network element, many of the circuit packs had to be further interconnected with one another using optical cables which often attached to the front panels associated with the circuit packs.

In addition to the specific functional circuitry on each circuit pack, each circuit pack contained circuitry and mechanical structures that were common to (i.e., repeated on) each circuit pack. For instance, each circuit pack would commonly contain a power supply circuit, a control or communication circuit, an electrical backplane connector, a mechanical front panel, one or more optical front panel connectors (used to interconnect optical oriented circuit packs to one another), and optical power monitoring circuitry.

Furthermore, since the surface area on any given circuit pack front panel was limited, some circuit packs had to contain high-density parallel optical connectors in order to accommodate the high number of interconnects associated with a given circuit pack. The parallel optical connectors required the use of complex adaptation cables (break-out cables), or external optical patch panels in order to convert the high-density optical connections to individual connections usable by other optical circuit packs.

The combination of the plurality of differing circuit packs, the plurality of optical connections between circuit packs, and the plurality of optical adaptation cables and optical patch panels, resulted in a DWDM network element that was difficult and error prone to install. Furthermore, optical power monitoring circuitry was required throughout the system in order to verify that the optical interconnect cables (interconnecting the various functional circuit packs) were connected to their proper points within the system.

Therefore, it can be seen that in order to lower the cost and simplify the installation of a DWDM network element, what is needed is a method of constructing a DWDM network element that eliminates much of the repeated common circuitry and mechanics on circuit packs, and eliminates many of the external optical interconnect cables, adaptation cables, and optical patch panels.

SUMMARY OF THE INVENTION

From the foregoing, it may be appreciated by those skilled in the art that a need has arisen for a simpler and more cost effective node configuration while providing a flexible design implementation. In accordance with the present invention, a method and apparatus for managing an optical signal are provided that substantially eliminate or greatly reduce disadvantages and problems associated with conventional optical node configurations and designs.

According to an embodiment of the present invention, there is provided an apparatus for managing an optical signal that includes a node having a first system optics card that provides channels to a first optical transport link and receives channels from a second optical transport link. The first system optics card may provide certain channels received from the second optical transport link to an optical converter card associated with a particular client device. The first system optics card may provide certain channels received from the second optical transport link to an optical converter card for feedback onto the first optical transport link. The first system optics card may provide certain channels received from the second optical transport link to one or more other system optics cards within the node. The node may contain one or more other system optics cards that interface with a plurality of client devices through a plurality of optical converter cards so that the node can provide multiple degrees of communication capability.

The present invention provides various technical advantages over conventional methods and apparatus for managing an optical signal. Some of these technical advantages are shown and described in the description of the present invention. Certain embodiments of the present invention may enjoy some, all, or none of these advantages. Other technical advantages may be readily apparent to those skilled in the art from the following figures, description, and claims.

BRIEF DESCRIPTION OF THE DRAWINGS

To provide a more complete understanding of the present invention and features and advantages thereof, reference is made to the following description of example embodiments of the present invention, taken in conjunction with the accompanying figures, wherein like reference numerals represent like parts, in which:

FIGS. 3A-3G illustrate an example implementation of the functional block diagram of the add/drop node;

FIG. 12 illustrates a process flow providing operation of a system optics card according to an example embodiment of the present invention;

FIG. 14 shows an example flow process outlining further operation of a system optics card according to an example embodiment of the present invention.

DETAILED DESCRIPTION OF THE INVENTION

Figure 1A:
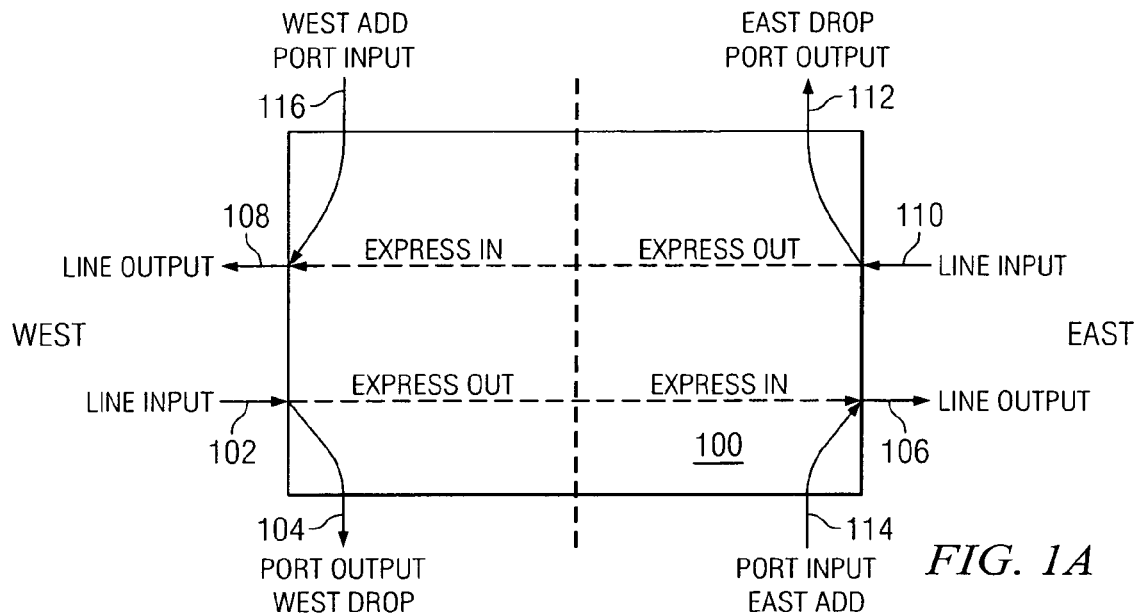
FIGS. 1A-1C illustrate add/drop nodes used in example embodiments of the present invention.
Figure 1B:
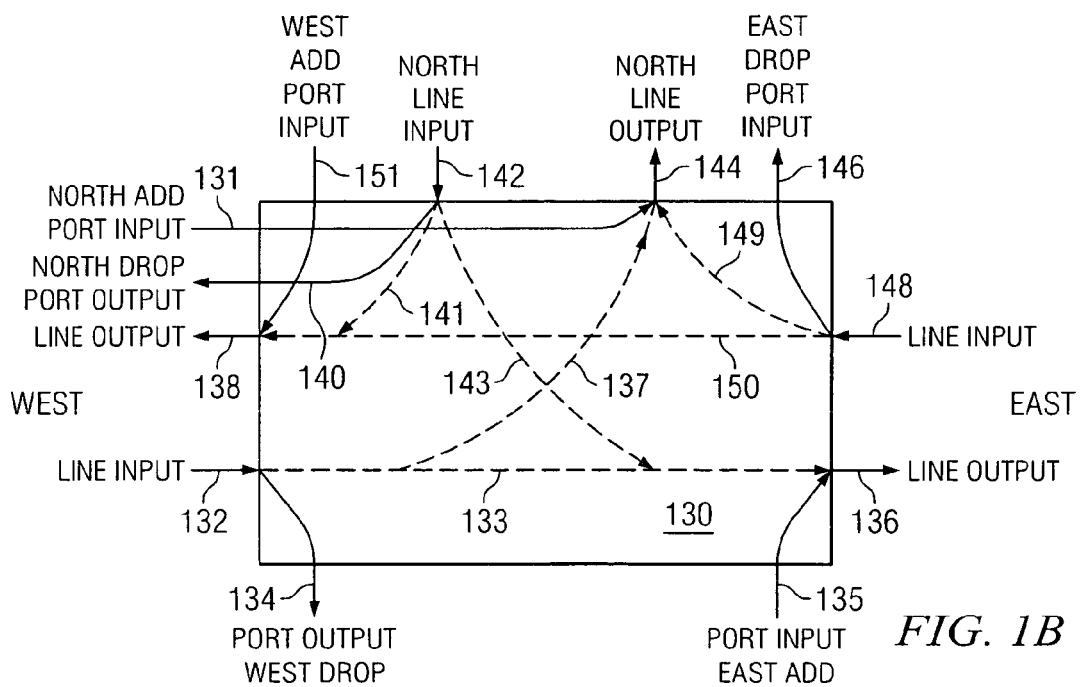
Figure 1C:
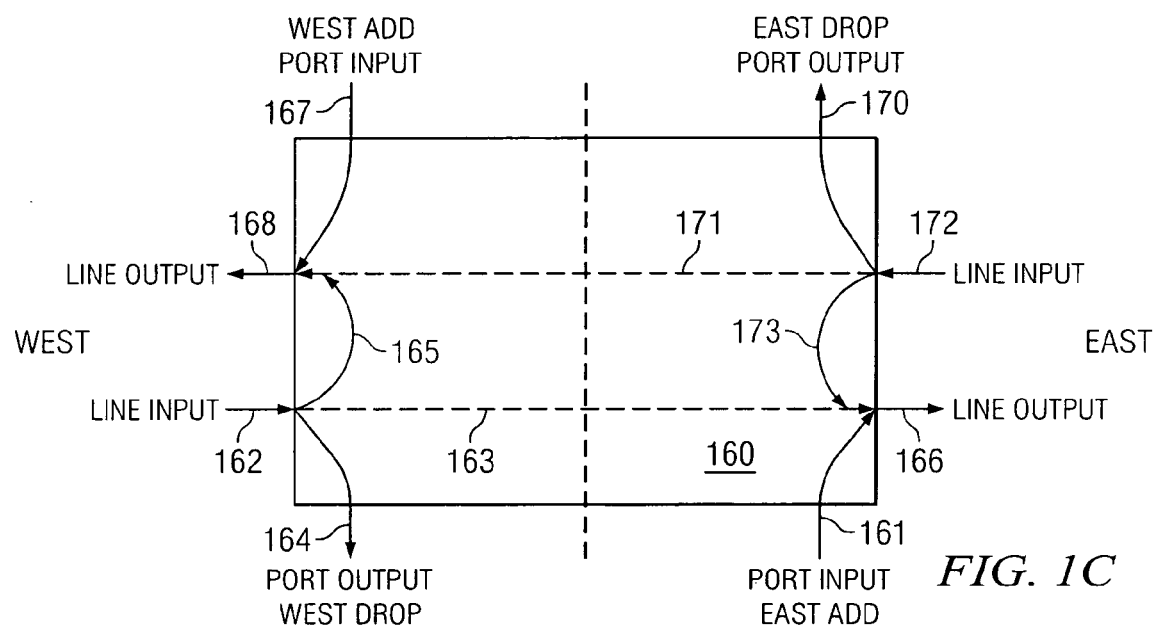

FIGS. 1A-1C illustrate example add/drop nodes 100, 130 and 160, respectively, for various embodiments of the present invention. In FIG. 1A, add/drop node 100 is an example of a 2-degree node, wherein channels making up a particular signal entering add/drop node 100 can exit add/drop node 100 in two directions. A West Line Input signal 102, transmitted from the West side, can enter add/drop node 100 and certain channels of West Line Input signal 102 can be dropped from add/drop node 100 to a client. A West Port Output line 104 indicates the dropped channels. Furthermore, certain channels of West Line Input signal 102 can be passed through add/drop node 100 toward the East side. Other channels can be added by a client to West line input signal 102 through a West Port Input line 114 for pass through to the East side. An East Line Output signal 106 indicates the passed-through channels. Similarly, an East Line Input signal 110, transmitted from the East side, can enter add/drop node 100. Certain channels of East Line Input signal 110 can be dropped at East Port Output line 112. Certain channels of East Line Input signal 110 can be passed through add/drop node 100 toward the West side as indicated by West Line Output signal 108. Other channels can be added by a client to East Line Input signal 110 through an East Port Input line 116. East and West line inputs and outputs may be provided by appropriate optical transport links.

In FIG. 1B, add/drop node 130 is an example 3-degree node, wherein channels making up a particular signal entering add/drop node 130 can exit add/drop node 130 in three directions. A West Line Input signal 132, transmitted from the West side, can enter add/drop node 130. Certain channels of West Line Input signal 132 can be dropped at a West Port Output line 134. Certain channels of West Line Input signal 132 to be passed through are provided to a West pass through line 133 to be combined with any other channels on a North pass through line 143 and a West Port Input line 135 to form an East Line Output signal 136 for a pass through path toward the East side. Furthermore, certain channels of West Line Input signal 132 to be passed through are provided to a West pass through line 137 to be combined with other channels of an East pass through line 149 and a North Port Input line 131 to form a North Line Output signal 144 for a pass through path toward the North side.

Transmitted from the East side, an East Line Input signal 148 can enter add/drop node 130. Certain channels of East Line Input signal 148 can be dropped at an East Port Output line 146. Certain channels of East Line Input signal 148 to be passed through are provided to an East pass through line 150 to be combined with any other channels on a North pass through line 141 and a West Port Input line 151 to form a West Line Output signal 138 for a pass through path toward the West side. Also, certain channels of East line input signal 148 to be passed through are provided to an East pass through line 149 to be combined with any other channels on West pass through line 137 and North Port Input line 131 to form North Line Output signal 144.

Transmitted from the North side, a North Line Input signal 142 can enter add/drop node 130. Certain channels of North Line Input signal 142 can be dropped at a North Port Output Line 140. Certain channels of North Line Input signal 142 to be passed through are provided to a North pass through line 143 to be combined with any other channels of West Pass through line 133 and West Port Input line 135 to form East Line Output signal 136 for a pass through path toward the East side. Furthermore, certain channels of North Line Input signal 142 to be passed through are provided on North pass through line 141 to be combined with any other channels on East pass through line 150 and East Port Input line 151 to form East Line Output signal 138 for a pass through toward the West side.

In FIG. 1C, add/drop node 160 is an example hybrid 3-degree node, wherein channels making up a particular signal entering add/drop node 160 can exit add/drop node 160 in three directions. A West Line Input signal 162, transmitted from the West side, can enter add/drop node 160. Certain channels of West Line Input signal 162 can be dropped at a West Port Output line 164. Certain channels of West Line Input signal 162 to be passed through are provided to a West pass through line 163 to be combined with any other channels on an East Port Input line 161 and an East feedback line 173 to form an East Line Output signal 166 for a pass through toward the East side. Furthermore, certain channels of West Line Input signal 162 may be provided to a West feedback line 165 to be combined with any other channels on an East pass through line 171 and a West Port Input line 167 to form West Line Output signal 168. In this manner, an optional feedback feature can be added to the configuration of any system at any node.

Transmitted from the East side, an East Line Input signal 172 can enter add/drop node 160. Certain channels of East Line Input signal 172 can be dropped at an East Port Output line 170. Certain channels of East Line Input signal 172 to be passed through are provided on East pass through line 171 to be combined with any other channels on West Port Input line 167 and West feedback line 165 to form West Line Output signal 168 for a pass through toward the West side. Furthermore, certain channels of East Line Input signal 172 may be provided to East feedback line 173 to be combined with any other channels on West pass through line 163 and East Port Input 161 to form East Line Output signal 166.

Figure 2A:
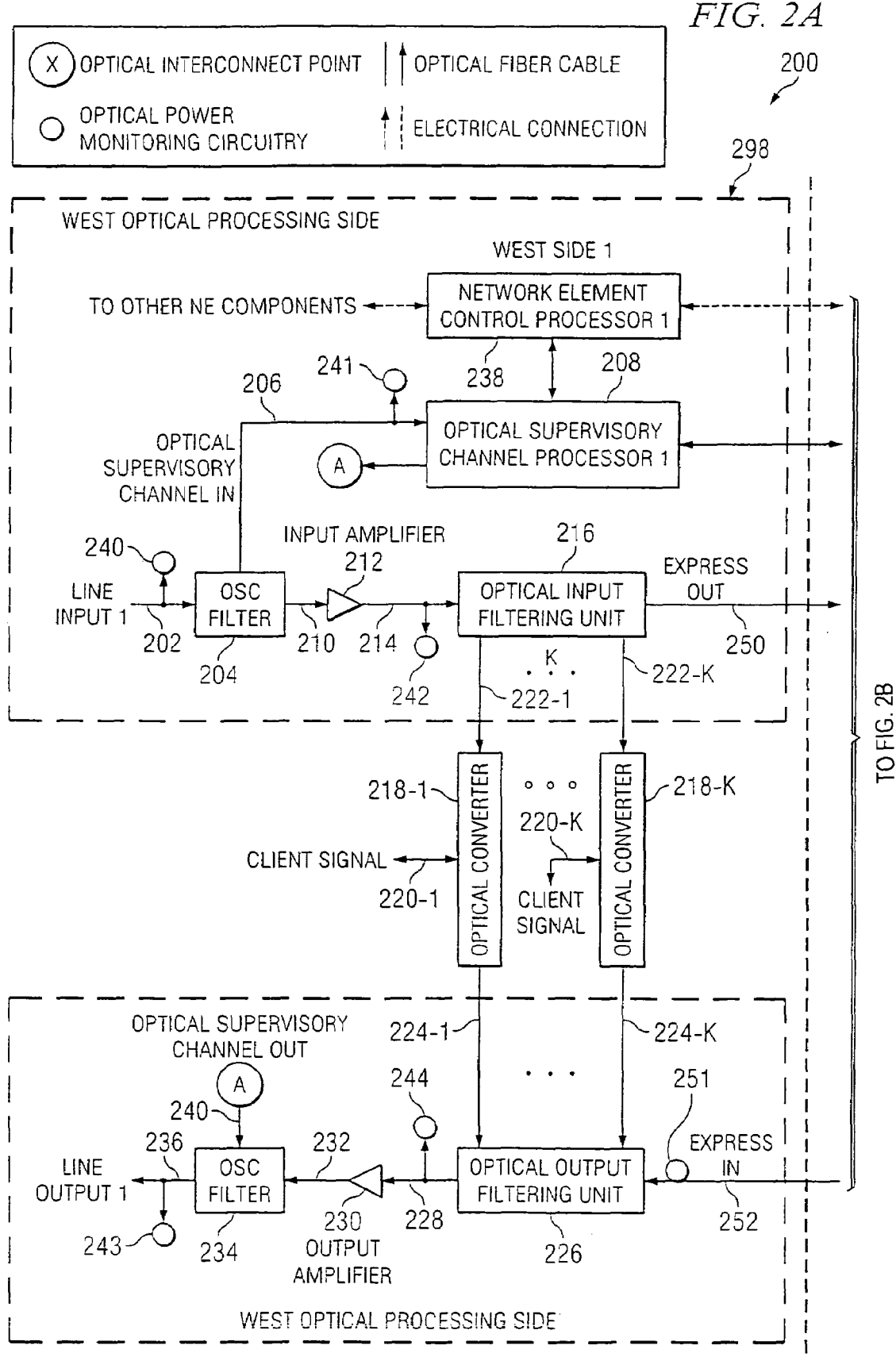
FIGS. 2A-2B illustrate a functional block diagram showing operation of an add/drop node in an example embodiment of the present invention.
Figure 2B:
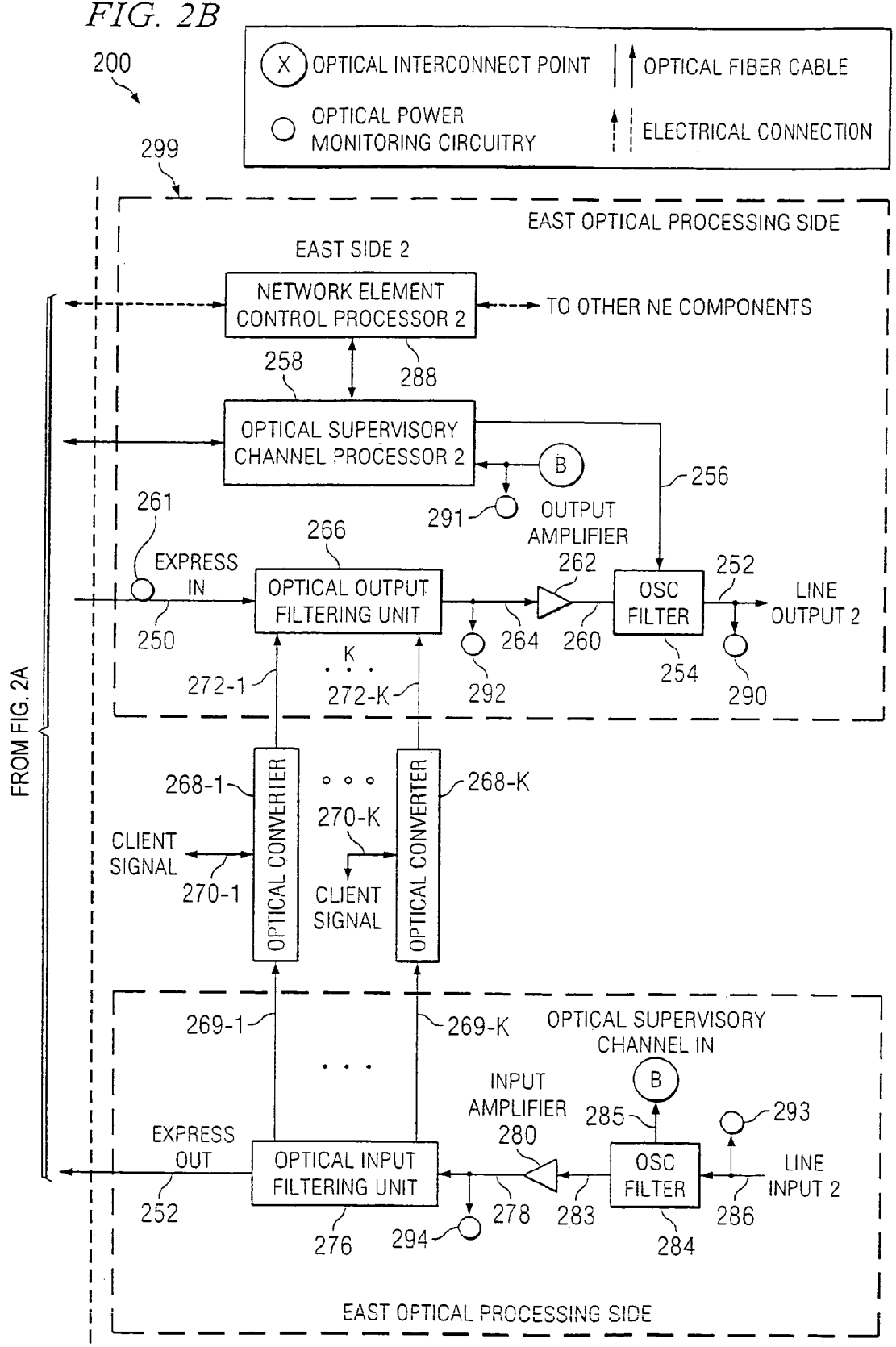

FIGS. 2A-2B show a functional block diagram of an example 2-degree add/drop node 200 which can be used to implement the functionality provided in the add/drop nodes of FIGS. 1A-1C. Add/drop node 200 can be divided into a West Side 298 and an East Side 299. The West side 298 can further be divided into a West optical processing side and a West group of optical converters 218-1 to 218-K. The East side 299 can further be divided into an East optical processing side and an East group of optical converters 268-1 to 268-K. The following describes methods used by add/drop node 200 for managing signals entering from West optical processing Side 298 and from East optical processing Side 299.

A West Line Input signal 202, received at West Side 298, can enter add/drop node 200 at a filter 204. One of the channels forming West Line Input signal 202 can be an optical supervisory channel. If an optical supervisory channel is present, filter 204 can filter the optical supervisory channel, indicated by line 206, from the other channels in West Line Input signal 202. The optical supervisory channel 206 can be forwarded to an optical supervisory channel processor 208 for further processing. The remaining channels, indicated by line 210, can be forwarded to an optical input amplifier 212 to be amplified by a predetermined amount of amplification. Optical input amplifier 212 can simultaneously amplify all channels input thereto. The amplified channels, indicated by line 214, can be transmitted to an optical input filtering unit 216. Optical input filtering unit 216 can be used to isolate individual channels. Individual channels can be (1) dropped from add/drop node 200 for transmission to a client, (2) combined with pass through channels from East Side 299 for optional feedback toward West side 298, (3) passed through to East Side 299 for combining with other channels, and/or (4) added for transport upon receipt from a client.

Certain channels from West Line Input signal 202 designated to be dropped for case (1) can be transmitted from optical input filtering unit 216 to individual optical converters 218-1 through 218-K over lines 222-1 to 222-K, where K is the total number of channels that can be converted corresponding to the number of clients being serviced at add/drop node 200. Also, certain channels from West Line Input signal 202 designated for optional feedback in West Side 298 for case (2) can be transmitted from optical input filtering unit 216 to individual optical converters 218-1 through 218-K over lines 222-1 to 222-K. At an optical converter 218-1, a channel from optical input filtering unit 216 can be converted to either a non-colored optical channel (e.g., a 1310 or 850 nm) or to an electrical channel or, in the opposite direction, a client input channel can be received from a client and converted to a colored optical signal (e.g., any of the wavelengths within the optical C-band) for adding to the stream for case (4). For case (1), a converted electrical channel can then be dropped to a client. For example, client channel 220-1, converted from optical converter 218-1, can be dropped from add/drop node 200. For case (4), client input channels received over lines 220-1 to 220-K to be added are provided by optical converters 218-1 to 218-K to corresponding lines 224-1 to 224-K for processing by an optical output filtering unit 226. Optical converters 218-1 to 218-K also provide the feedback channels to optical output filtering unit 226 for case (2). Optical output filtering unit 226 can multiplex converted channels provided by optical converters 218-1 to 218-K with pass through channels from East Side 299 on line 252 to form combined channel signal 228. Combined channel signal 228 can then be amplified by output amplifier 230 by a predetermined amount of amplification to form amplified channel signal 232. Amplified channel signal 232 can be transmitted to optical supervisory channel filter 234, where an optical supervisory channel signal 240 may be combined with amplified channel signal 232 to form West Line Output signal 236.

Channels from West Line Input signal 202 that are designated for pass through to East Side 299 in case (3) are transmitted to optical output filtering unit 266 over line 250. Optical output filtering unit 266 can multiplex channels on line 250 with other channels from optical line converters 268-1 to 268-K over lines 272-1 to 272-K. A combined channel signal 264 is transmitted from optical output filtering unit 266 to an output optical amplifier 262 for amplification by a predetermined amount of amplification. An amplified channel signal 260 is transmitted to an optical supervisory channel filter 254, where amplified channel signal 260 is combined with an output optical supervisory channel signal 256 to form East Line Output signal 252.

An East Line Input signal 286, received at East Side 299 enter add/drop node 200 at a filter 284. One of the channels forming East Line Input signal 286 can be an optical supervisory channel. If an optical supervisory channel is present, filter 284 can filter the optical supervisory channel, indicated by line 285, from the other channels in East Line Input signal 286. The optical supervisory channel 285 can be forwarded to an optical supervisory channel processor 258 for further processing. The remaining channels, indicated by line 283, can be forwarded to an optical input amplifier 280 to be amplified by a predetermined amount of amplification. Optical input amplifier 280 can simultaneously amplify all channels input thereto. The amplified channels, indicated by line 278, can be transmitted to an optical input filtering unit 276. Optical input filtering unit 276 can be used to isolate individual channels. The individual channels can be (1) dropped from add/drop node 200 for transmission to a client, (2) combined with pass through channels from West Side 298 for optional feedback toward East Side 299, (3) passed through to West Side 298 for combining with other channels, and/or (4) added for transport upon receipt from a client.

Certain channels from East Line Input signal 286 designated to be dropped for case (1) can be transmitted from optical input filtering unit 276 to individual optical converters 268-1 through 268-K over lines 269-1 to 269-K, where K is the total number of channels that can be converted corresponding to the number of clients being serviced at add/drop node 200. Also, certain channels from East Line Input signal 286 designated for optional feedback in East Side 299 for case (2) can be transmitted from optical input filtering unit 276 to individual optical converters 268-1 to 268-K over lines 269-1 to 269-K. At an optical converter 268-1, a channel from optical input filtering unit 276 can be converted to either a non-colored optical channel (e.g., a 1310 or 850 nm) or to an electrical channel or, in the opposite direction, a client input channel can be received from a client and converted to a colored optical signal for adding to the stream. For case (1), a converted electrical channel can then be dropped to a client. For example, client channel 270-1, converted from optical converter 268-1, can be dropped from add/drop node 200. For case (4), client input channels received over lines 270-1 to 270-K to be added are provided by optical converters 268-1 to 268-K to corresponding lines 272-1 to 272-K for processing by an optical output filtering unit 266. Optical converters 268-1 to 268-K also provide the feedback channels to optical output filtering unit 266. Optical output filtering unit 266 can multiplex converted channels provided by optical converters 268-1 to 268-K with pass through channels from West Side 298 on line 250 to form combined channel signal 264. Combined channel signal 264 can then be amplified by output amplifier 262 by a predetermined amount of amplification to form amplified channel signal 260. Amplified channel signal 260 can be transmitted to optical supervisory channel filter 254, where an optical supervisory channel signal 256 may be combined with amplified channel signal 260 to form East Line Output signal 252.

Channels from East Line Input signal 286 that are designated for pass through to West Side 298 in case (3) are transmitted to optical output filtering unit 226 over line 252. Optical output filtering unit 226 can multiplex channels on line 252 with other channels from optical line converters 218-1 to 218-K over lines 224-1 to 224-K. A combined channel signal 228 is transmitted from optical output filtering unit 226 to an output optical amplifier 230 for amplification by a predetermined amount of amplification. An amplified channel signal 232 is transmitted to an optical supervisory channel filter 234, where amplified channel signal 232 is combined with an output optical supervisory channel signal 240 to form West Line Output signal 236.

From FIGS. 2A-2B, it can be seen that there are two paths through add/drop node 200. One path (Path W-E) begins at West Line Input signal 202 and ends at East Line Output 252. The other path (Path E-W) begins at East Line Input signal 286 and ends at West Line Output signal 236. The signals in both paths pass through a similar set of components. Furthermore, in FIGS. 2A-2B there can be optical monitoring points associated with each path. For example, Path W-E has optical monitoring points at 240, 242, 261, 290, and 292. Path E-W has optical monitoring points at 243, 244, 251, 293 and 294. The optical monitoring points can be used to help set the optical gain of the signals passing through the associated amplifier, to power balance the individual optical channels on the line output, and to verify connectivity through the node.

In FIGS. 2A-2B, it can be seen that a great deal of component redundancy is present. For instance, there are two network element control processors (238, 288) controlling each of East Side 299 and West Side 298 components, two optical supervisory channel processors (208, 258) for control signal insertion and extraction, and two identical data-paths (Path W-E, Path E-W). This redundancy helps to transport data in the network in the presence of failures within the network. A network constructed in such a manner is often called a "fault tolerant" network.

Figure 3G:
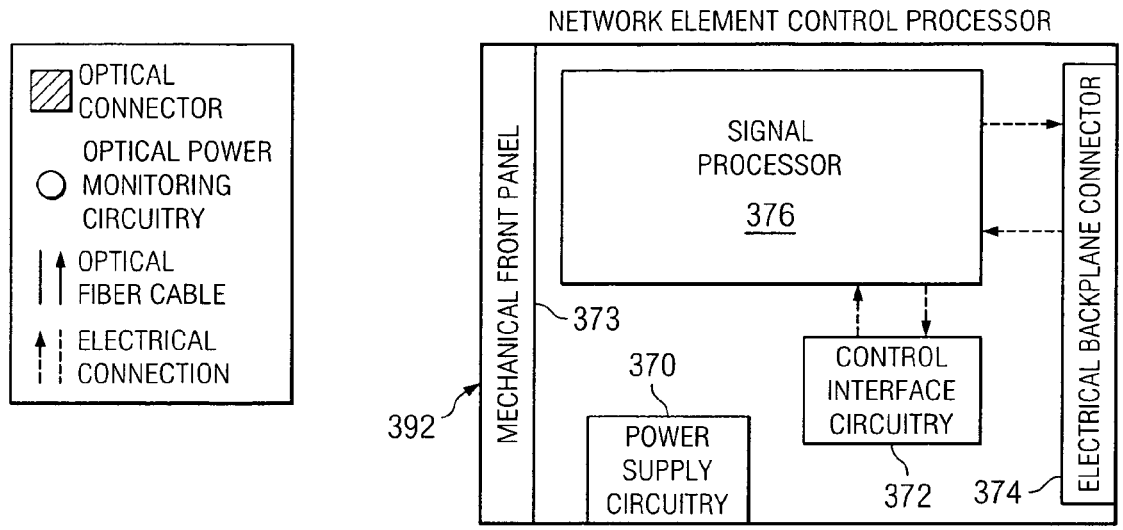

FIGS. 3A-3G show one implementation of the functional operation shown in FIGS. 2A-2B. Each function of FIGS. 2A-2B is placed on a separate individual circuit pack of FIGS. 3A-3G. FIG. 3A shows an input amplifier circuit pack 380 that implements the functionality of optical supervisory channel filter 204 and input amplifier 212 of FIG. 2A or optical supervisory channel filter 284 and input amplifier 280 of FIG. 2B. FIG. 3B shows an input filtering circuit pack 382 that implements the functionality of optical input filtering unit 226 of FIG. 2A and optical input filtering unit 276 of FIG. 2B. FIG. 3C shows an optical supervisory channel processor card 384 that implements the functionality of optical supervisory channel processor 208 of FIG. 2A or optical supervisory channel processor 258 of FIG. 2B. FIG. 3D shows an optical converter card 386 that implements the functionality of any of optical converters 218-1 to 218-L of FIG. 2A or any of optical converters 268-1 to 268-L of FIG. 2B. FIG. 3E shows an output amplifier circuit pack 388 that implements the functionality of optical supervisory channel filter 234 and output amplifier 230 of FIG. 2A or optical supervisory channel filter 254 and output amplifier 262 of FIG. 2B. FIG. 3F shows an output filtering circuit pack 390 that implements the functionality of optical output filtering unit 226 of FIG. 2A or optical output filtering unit 266 of FIG. 2B. FIG. 3G shows a network element control card 392 that implements the functionality of network element control processor 238 of FIG. 2A or network element control processor 288 of FIG. 2B.

Each of the circuit packs of FIGS. 3A-3G include certain electrical, optical, and mechanical functions repeated in each circuit pack. For instance, repeated functions include a power supply circuit 370, a power monitor circuit 371, and control interface circuits 372. Also, each circuit pack includes a front panel 373, electrical backplane connectors 374, and optical connectors 375. Separate signal processors 376 may also be provided on individual circuit packs.

Figure 4:
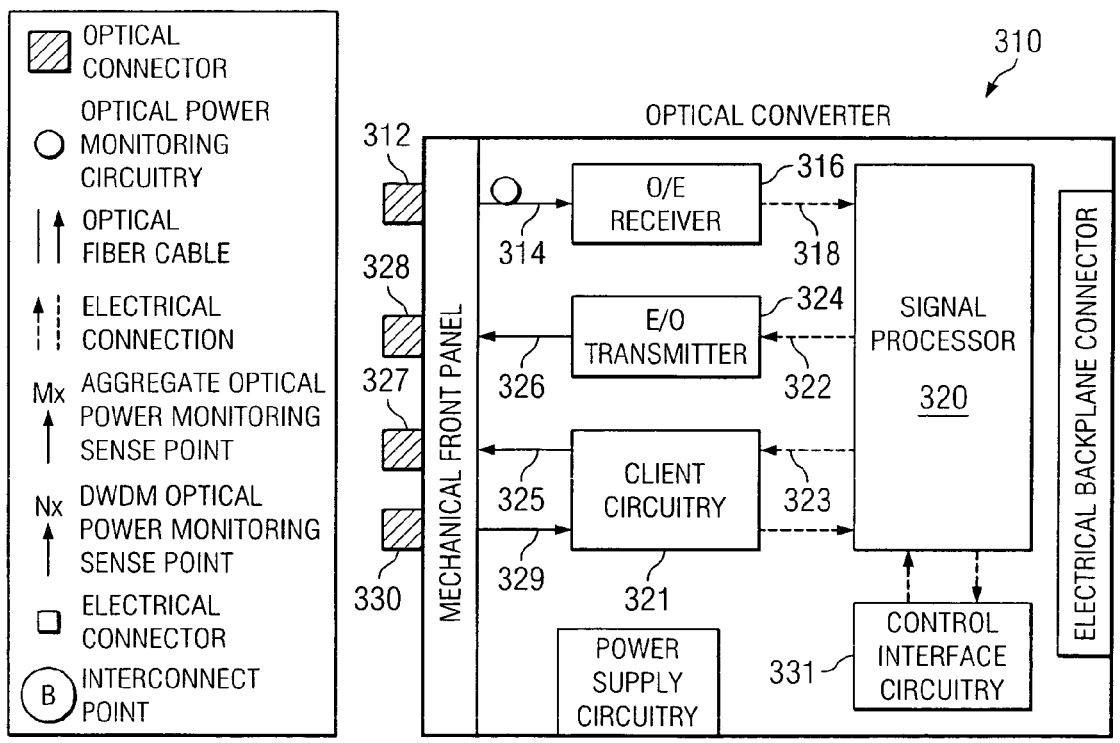
FIG. 4 illustrates an optical converter card for an add/drop node used in an example embodiment of the present invention.

FIG. 4 shows an example of an optical converter card 310 according to an embodiment of the present invention. Optical converter card 310 implements the functionalities of optical converters 218-1 to 218-K and 268-1 to 268-K of FIGS. 2A-2B. The key depicted in FIG. 4 is common to other figures provided and described herein. Optical converter card 310 includes a system input port 312 for receiving signals from an appropriate one of lines 222-1 to 222-K and 269-1 to 269-K of FIGS. 2A-2B. Optical converter card 310 also includes a system output port 328 for providing signals to an appropriate one of lines 224-1 to 224-K and 272-1 to 272-K of FIGS. 2A-2B. An individual channel signal 314 transmitted to input port 312 can be converted by an optical/electrical receiver 316 to form an electrical channel signal 318. Electrical channel signal 318 can then be processed by signal processor 320 and forwarded to client circuitry 321 within optical converter card 310 as a processed drop signal 323. Client circuitry 321 generates a client drop signal 325 for transmission to a client over an appropriate one of lines 220-1 to 220-K and 270-1 to 270-K of FIGS. 2A-2B through a client output port 327.

Client add signals 329 received over the appropriate one of lines 220-1 to 220-K and 270-1 to 270-K of FIGS. 2A-2B at a client input port 330 are provided to client circuitry 321. Client circuitry 321 generates a processed add signal for transmission to signal processor 320. Signal processor 320 provides an electrical channel signal 322 to an electrical/optical transmitter 324 for conversion to an optical signal to form an individual channel signal 326. Individual channel signal 326 exits optical converter card 310 at system output port 328.

Control interface circuitry 331 provides signaling to control signal processor 320 in the processing of add/drop channel signals and feedback channel signals. Feedback channel signals may be provided through system input port 312 from an appropriate one of lines 222-1 to 222-K and 269-1 to 269-K of FIGS. 2A-2B, converted into an electrical signal by optical/electrical receiver 316, and processed by signal processor 320. Signal processor 320 than can provide the feedback signal to electrical/optical transmitter 324 for output to an appropriate one of lines 224-1 to 224-K and 272-1 to 272-K of FIGS. 2A-2B through system output port 328. Processing performed by optical converter card 310 can include for example converting a channel to a non-colored optical channel (e.g., a 1310 or 850 nm). As shown, an optical converter card 310 would occupy each of optical converters 218-1 to 218-K and 268-1 to 268-K of FIGS. 2A-2B. However, optical converter card 310 may be readily designed to provide the functionality for multiple ones of optical converters 218-1 to 218-K and 268-1 to 268-K of FIGS. 2A-2B.

Figure 5:
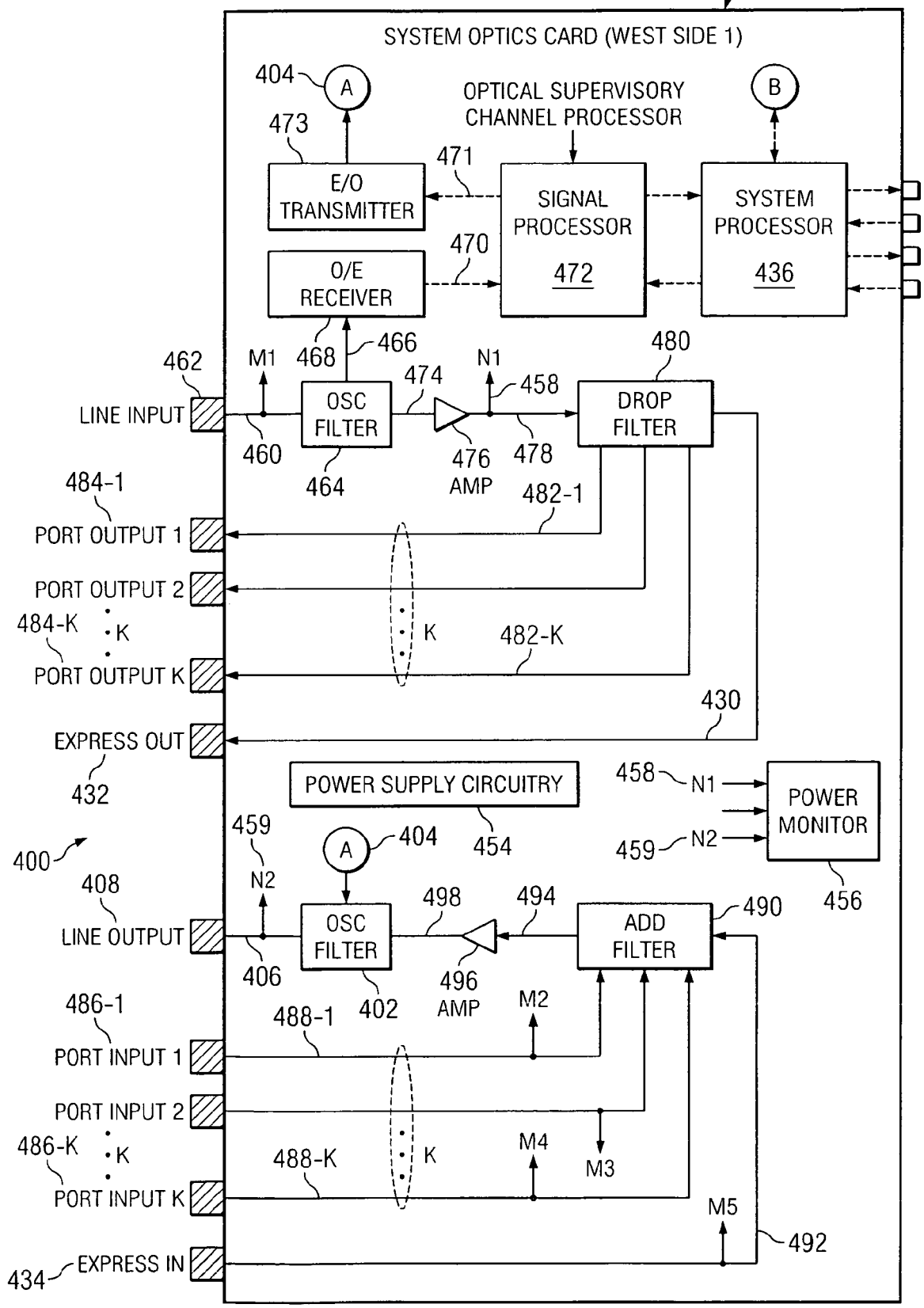
FIG. 5 illustrates a systems optics card employing the functional operation for an add/drop node used in an example embodiment of the present invention.

FIG. 5 depicts a system optics card 450 according to an example embodiment of the present invention. The functionality of one side of add/drop node 200 such as West side 298 of FIGS. 2A-2B can be reduced to a system optics card 450 and one or more optical converter cards 310. System optics card 450 shows that common optics and control circuitry within West Side 298 of FIGS. 2A-2B, other than optical converters 218-1 to 218-K of FIGS. 2A-2B, can be placed on a single substrate, such as a printed circuit board 452. A single power supply 454 can be used to power system optics card 450. A single centralized optical power monitor 456 can be used to measure multiple points, such as points N1 458 and N2 459, throughout system optics card 450. The majority of the optical cabling used to interconnect all circuit packs of conventional designs can be integrated within system optics card 450, thus removing mechanical, electrical, and optical connectors, avoiding problems related to malfunctions of these extra components, and increasing the overall system reliability when compared to conventional add/drop node designs.

A West Line Input signal 460, received into West Side 298 can enter system optics card 450 at a line input port 462. One of the channels forming West Line Input signal 460 can be an optical supervisory channel. If an optical supervisory channel is present, filter 464 can filter the optical supervisory channel, indicated by line 466, from the other channels in West Line Input signal 460. The optical supervisory channel 466 can be forwarded to an optical/electrical receiver 468, where it is converted to an electrical channel 470, and then processed by an optical supervisory channel processor 472. Optical supervisory channel processor 472 may provide control signals over an electrical channel 471 for conversion by an electrical/optical transmitter 473. Electrical/optical transmitter 473 generates an optical supervisory channel 404 for combination with amplified channels 498 at a filter 402 to produce West Line Output signal 406 at line output port 408. Optical supervisory channel processor cooperates with a system processor 436 in the processing and generation of optical supervisory channels.

The remaining channels of West Line Input signal 460 are forwarded to an optical input amplifier 476 over line 474 to be amplified by a predetermined amount of amplification. Optical input amplifier 476 can simultaneously amplify all channels input to the amplifier. The amplified channels, indicated by line 478, can be transmitted to a drop filter 480. Drop filter 480 performs the functions of optical input filtering unit 216 of FIGS. 2A-2B. Drop filter 480 can be used to isolate individual channels. The individual channels can be (1) dropped from system optics card 450 for transmission to a client, (2) combined with pass through channels from an East Side system optics card for optional feedback through systems optics card 450, (3) passed through to an East Side system optics card for combining with other channels, and/or (4) added for transport upon receipt from a client.

Certain channels from West Line Input signal 460 designated for case (1) and/or case (2) can be transmitted from drop filter 480 on lines 482-1 through 482-K to Port Outputs 484-1 through 484-K, respectively. Each of the Port Outputs 484-1 through 484-K can be connected to an individual system input port 312 on an optical converter card 310 of FIG. 4. For example, output port 484-1 can be connected to system input port 312 of optical converter card 310. For case (3), certain channels from West Line Input signal 460 can be transmitted from drop filter 480 to Express Out port 432 for pass through to a system optics card at East Side 299.

For case (2) and case (4), feedback channel signals and client add signals can be transmitted from output port 328 of Optical converter card 310 in FIG. 4 to one of the Port Inputs 486-1 to 486-K of system optics card 450. For example, output port 328 of optical converter card 310 in FIG. 4 may be connected to Port Input 486-1. After entering any of Port Inputs 486-1 to 486-K, the feedback channel signal and/or client add signal is transmitted to add filter 490 over lines 488-1 to 488-K. Add filter 490 performs the functions of optical output filtering unit 226 of FIGS. 2A-2B. Add filter 490 can multiplex channels input to it from lines 488-1 through 488-K to form combined channels 494. Add filter 490 may also receive pass through signals from a system optics card at East Side 299 through an Express In port 434 over line 492 and be combined with signals 488-1 to 488-K to form signal 494. Combined channels 494 can then be amplified by an output amplifier 496 by a predetermined amount of amplification to form amplified channels 498. Amplified channels 498 can be transmitted to optical supervisory channel filter 402, where an optical supervisory channel 404 is combined with amplified channels 498 to form West Line Output signal 406 for output from system optics card 450 at line output port 408.

The system optics card implementation of FIG. 5 eliminates some of the redundancies provided in the individual circuit pack implementation of FIGS. 3A-3G. For example, only a single power supply 454 is needed to power the functions of system optics card 450. A single power monitor 456 is used to check various signals within system optics card 450. Through front card connections, system optics card 450 may not need an electrical backplane connector or mechanical front panel. A number of optical connectors may also be reduced in the implementation of system optics card 450 as opposed to the multiple circuit pack implementation of FIGS. 3A-3G. A single signal processor 472 and system processor 436 may be provided to support the functionalities of system optics card 450.

Figure 6:
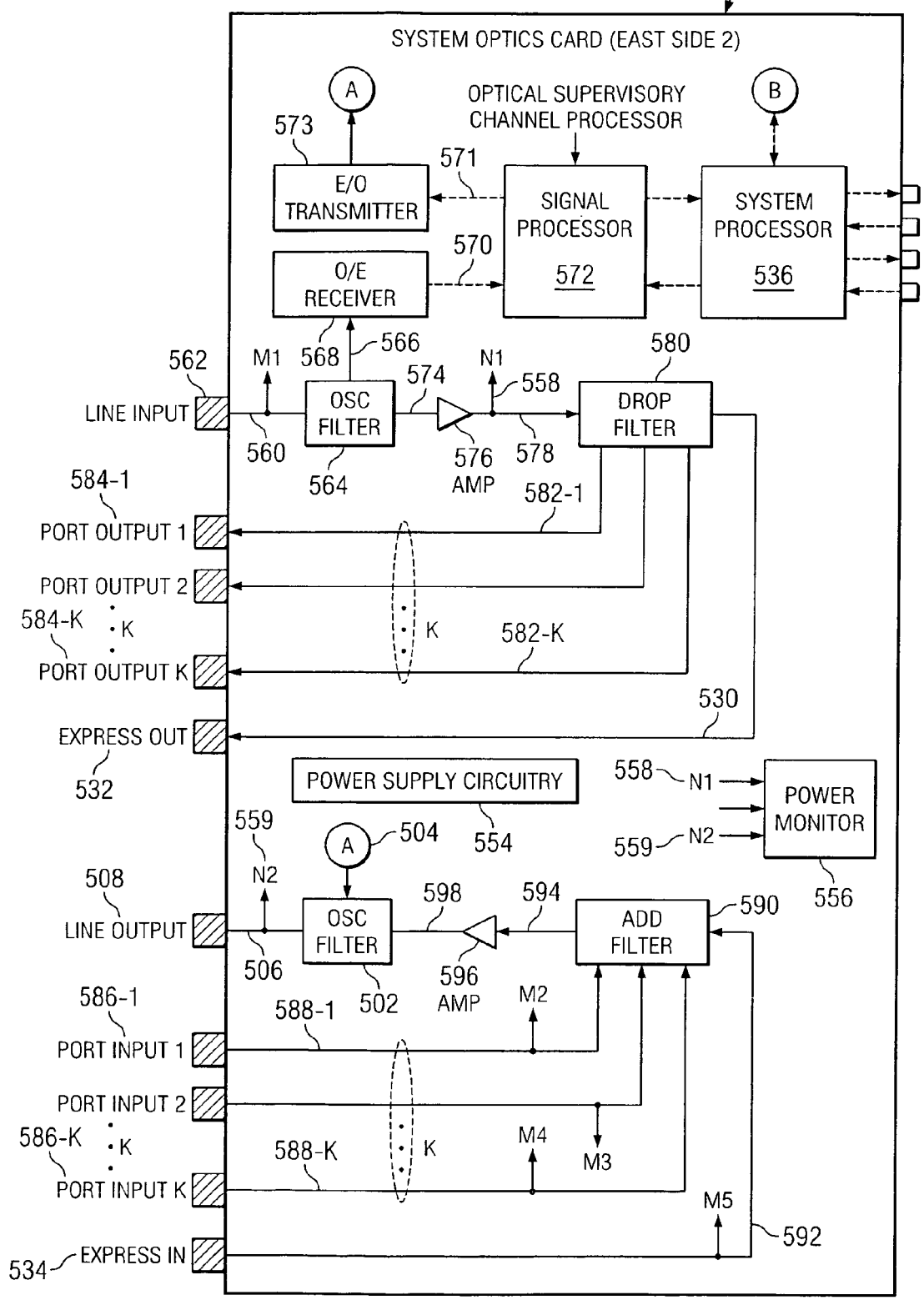
FIG. 6 illustrates a systems optics card employing the functional operation for an add/drop node used in an example embodiment of the present invention.

FIG. 6 depicts a system optics card 550 according to an example embodiment of the present invention. To implement another optical processing side of add/drop node 200 such as the East processing side, system optics card 550 can be used. System optics card 550 may be identical to or provide the same functionalities as system optics card 450 of FIG. 5. Accordingly, the combination of optical converter cards 310, system optics card 450, and system optics card 550 can be used to implement a 2-degree add/drop node. System optics card 550 shows that common optics and control circuitry within East Side 299 of FIGS. 2A-2B, other than optical converters 268-1 to 268-K of FIGS. 2A-2B, can be placed on a single substrate, such as a printed circuit board 552. A single power supply 554 can be used to power system optics card 550. A single centralized optical power monitor 556 can be used to measure multiple points, such as points N1 558 and N2 559, throughout system optics card 550. The majority of the optical cabling used to interconnect all circuit packs of conventional designs can be integrated within system optics card 550, thus removing mechanical, electrical, and optical connectors, avoiding problems related to malfunctions of these extra components, and increasing the overall system reliability when compared to conventional add/drop node designs.

Certain channels from West Line Input signal 460 of FIG. 5 that are designated for case (3) pass through are transmitted out of system optics card 450 at West Express Out port 432. West Express Out port 432 is connected to East Express In port 534 of system optics card 550 of FIG. 6. After entering East Express In port 534, pass through signals are provided to an add filter 590 over line 592. Add filter 590 can multiplex pass through signals from line 592 with feedback channel signals and client add signals from system output ports 328 of optical converter cards 310 on respective lines 588-1 to 588-K. Combined channels, indicated by line 594, can be transmitted to an output optical amplifier 596 for amplification by a predetermined amount of amplification. Amplified channels, indicated by line 598, can be transmitted to optical supervisory channel filter 502, where amplified channels 598 can be combined with an output optical supervisory channel signal 504 to form East Line Output signal 506, which is output from system card 550 at line output port 508.

An East Line Input signal 560, received into East Side 299 can enter system optics card 550 at a line input port 562. One of the channels forming East Line Input signal 560 can be an optical supervisory channel. If an optical supervisory channel is present, filter 564 can filter the optical supervisory channel, indicated by line 566, from the other channels in East Line Input signal 560. The optical supervisory channel 566 can be forwarded to an optical/electrical receiver 568, where it is converted to an electrical channel 570, and then processed by an optical supervisory channel processor 572. Optical supervisory channel processor 572 may provide control signals over an electrical channel 571 for conversion by an electrical/optical transmitter 573. Electrical/optical transmitter 573 generates an optical supervisory channel 504 for combination with amplified channels 598 at a filter 502 to produce East Line Output signal 506 at line output port 508. Optical supervisory channel processor 572 cooperates with a system processor 536 in the processing and generation of optical supervisory channels.

Certain channels from East Line Input signal 560 designated for case (1) and/or case (2) can be transmitted from drop filter 580 on lines 582-1 through 582-K to Port Outputs 584-1 through 584-K, respectively. Each of the Port Outputs 584-1 through 584-K can be connected to an individual system input port 312 on an optical converter card 310 of FIG. 4. For example, output port 584-1 can be connected to system input port 312 of optical converter card 310. For case (3), certain channels from East Line Input signal 560 can be transmitted from drop filter 580 to Express Out port 532 for pass through to system optics card 450 at West Side 298. Express Out port 532 is connected to Express In port 434 of system optics card 450.

In an example embodiment of the present invention, system processors 436 and 536 can be placed on a separate substrate from the other components of system optics cards 450 and 550, such as on an auxiliary printed circuit board, so that a system processor can be replaced without disrupting optic traffic through the system. For this example embodiment, a single system processor 436 placed on a separate substrate could control multiple system optics cards 450 and 550. Furthermore, a redundant system processor 536 can be used in addition to the single system processor 436. In another example embodiment of the present invention, drop units 490 and 590 and add units can be depopulated from system optics cards 450 and 550 to provide a system optics card that provides amplification without filtering.

From the above discussion of the various example embodiments, it is apparent that one of skill in the art can easily modify system optics cards 450 and 550 as desired for made to order designs per application requirements. For example, a system optics card 450 may include a low gain input amplifier in short span optical signal transport environments or high gain amplifiers for long span optical signal transport environments. Moreover, a single input amplifier that is capable of selecting between low and high gains may be implemented in system optics card 450 to provide flexible options to handle short and long span environments. For different add/drop port applications, system optics card 450 may include colorless filtering units or no filtering units as desired. The number of add/drop ports and filtering units may be tailored to the specific application.

Figure 7A:
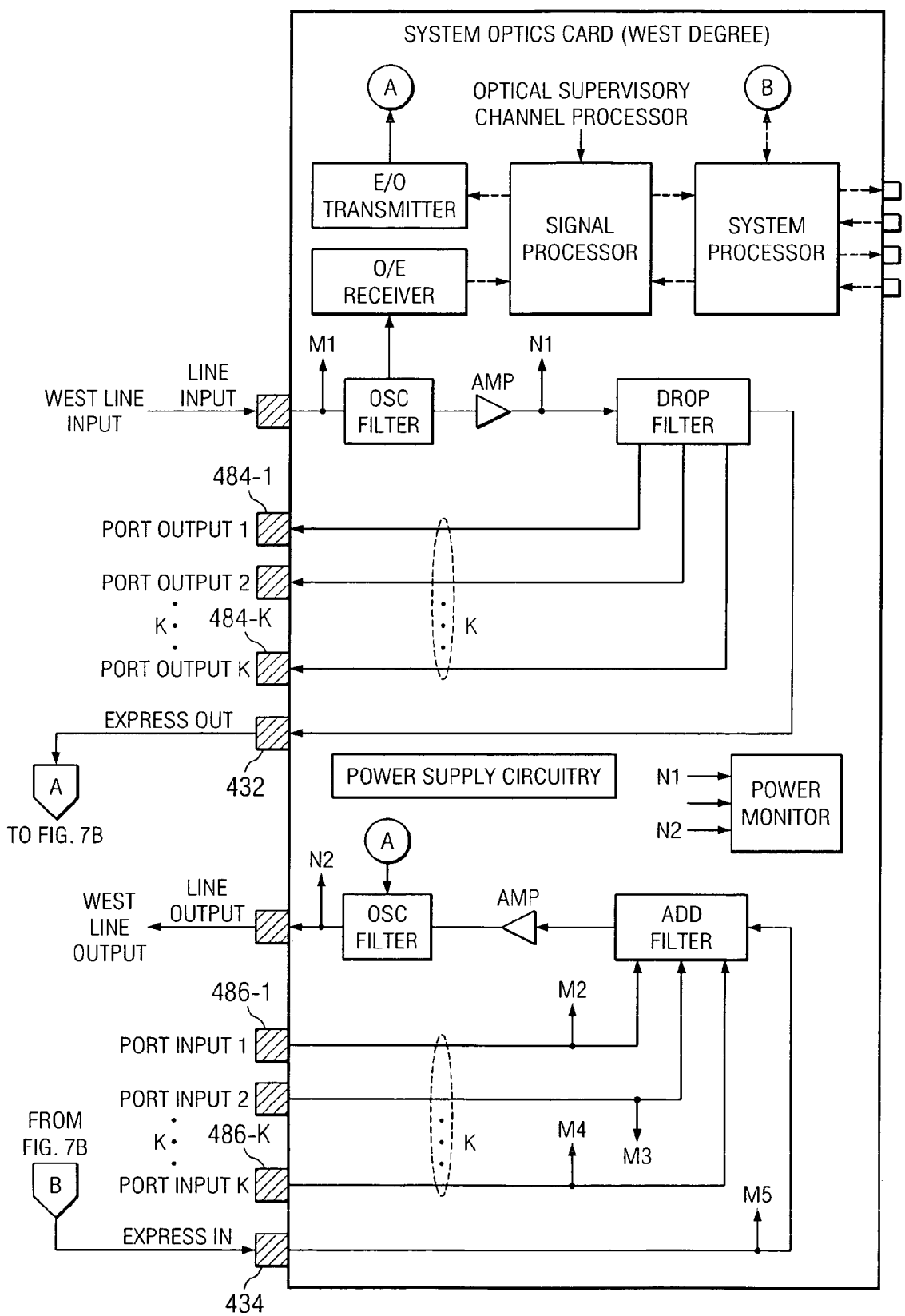
FIGS. 7A-7B illustrate implementation of a two degree add/drop node using two system optics card in an example embodiment of the present invention.
Figure 7B:
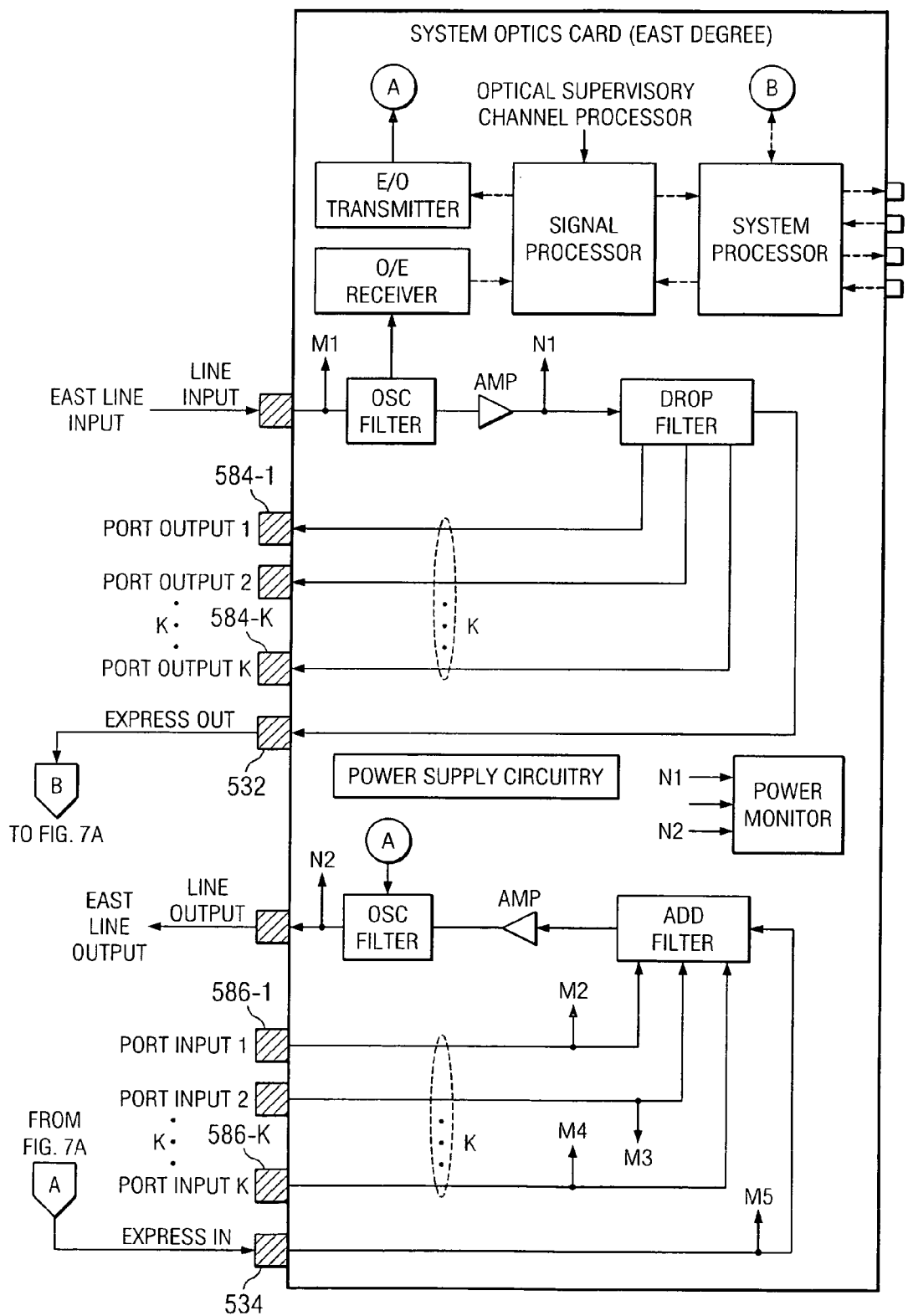

FIGS. 7A-7B show an interconnection of system optics card 450 and system optics card 550 to provide a 2-degree add/drop node. As discussed above, the combination of optical converter cards 310 of FIG. 4, system optics card 450 in FIG. 5, and system optics card 550 in FIG. 6 can be used to implement a 2-degree add/drop node so that a single system optics card 450 can manage signals entering from or exiting to a particular side (e.g. West Side 298), while another system optics card 550 can manage signals entering from or exiting to another side (e.g. East Side 299) of an add/drop node. In this example embodiment, Express Out port 432 of system optics card 450 is connected to Express In port 534 of system optics card 550. Furthermore, Express Out port 532 of system optics card 550 is connected to Express In port 434 of system optics card 450. Optical converter cards 310 of FIG. 4 can be connected to Port Outputs 484-1 to 484-K through system input ports 312 and can also be connected to Port Input 486-1 to 486-K through system output ports 328. In addition, optical converter cards 310 can be connected to Port Outputs 584-1 to 584-K through system input ports 312 and can also be connected to Port Inputs 586-1 to 586-K through system output ports 328.

Figure 8:
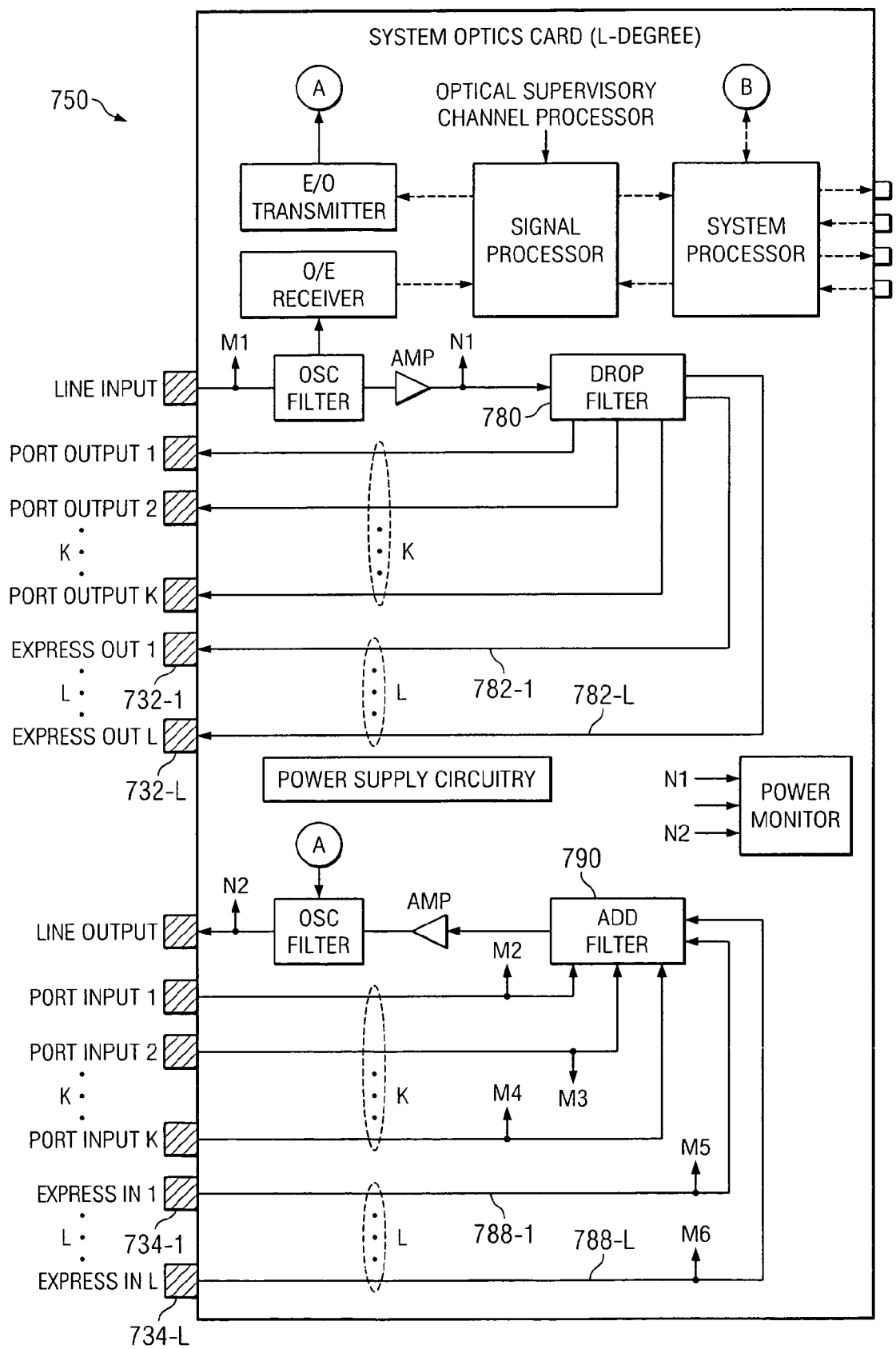
FIG. 8 illustrates a system optics card capable of providing a multiple degree node in an example embodiment of the present invention.

FIG. 8 shows an alternative system optics card 750 according to an alternative embodiment of the present invention. System optics card 750 includes all the features of system optics cards 450 and 550 plus additional Express In ports 734-1 to 734-L and additional Express Out ports 732-1 to 732-L. By having multiple Express In ports 734-1 to 734-L and Express Out ports 732-1 to 732-L, system optics card 750 may provide a 3-degree or greater add/drop node. Drop filter 780 includes additional functionality to provide certain channels to multiple Express Out ports 732-1 to 732-L over lines 782-1 to 782-L. Add filter 790 includes additional functionality for multiplexing channels received through multiple Express In ports 734-1 to 734-L over lines 788-1 to 788-L.

Figure 9:
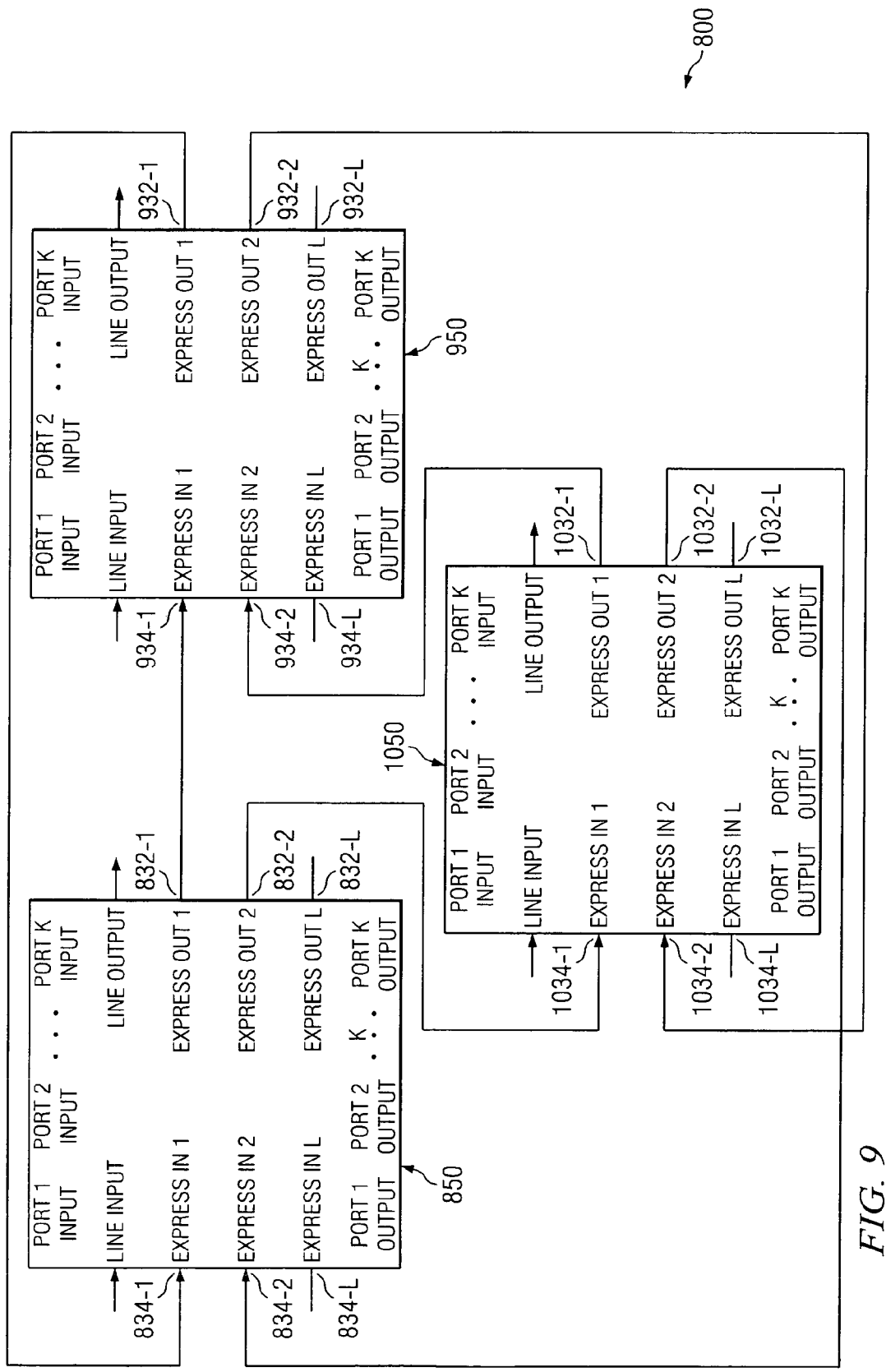
FIG. 9 illustrates interconnections of system optics card to form a three degree add/drop node in an example embodiment of the present invention.

FIG. 9 shows a system 800 that uses multiple system optics cards 750 to generate a 3-degree add/drop node. FIG. 9 shows system optics cards 850, 950, and 1050 that may be similar in nature to system optics card 750 of FIG. 8. System optics card 850 includes Express Out ports 832-1 to 832-L and Express In ports 834-1 to 834-L. System optics card 950 includes Express Out ports 932-1 to 932-L and Express In ports 934-1 to 934-L. System optics card 1050 includes Express Out ports 1032-1 to 1032-L and Express In ports 1034-1 to 1034-L. Express Out port 832-1 is coupled to Express In port 934-1. Express Out Port 832-2 is coupled to Express In port 1034-1. Express Out port 932-1 is coupled to Express In port 834-1. Express Out Port 932-2 is coupled to Express In port 1034-2. Express Out port 1032-1 is coupled to Express In port 934-2. Express Out Port 1032-2 is coupled to Express In port 834-2. Through this configuration, system 800 provides a 3-degree add/drop node as illustrated in FIG. 1B. A 4-degree add/drop node can be obtained by adding an additional system optics card to system 800.

Figure 10:
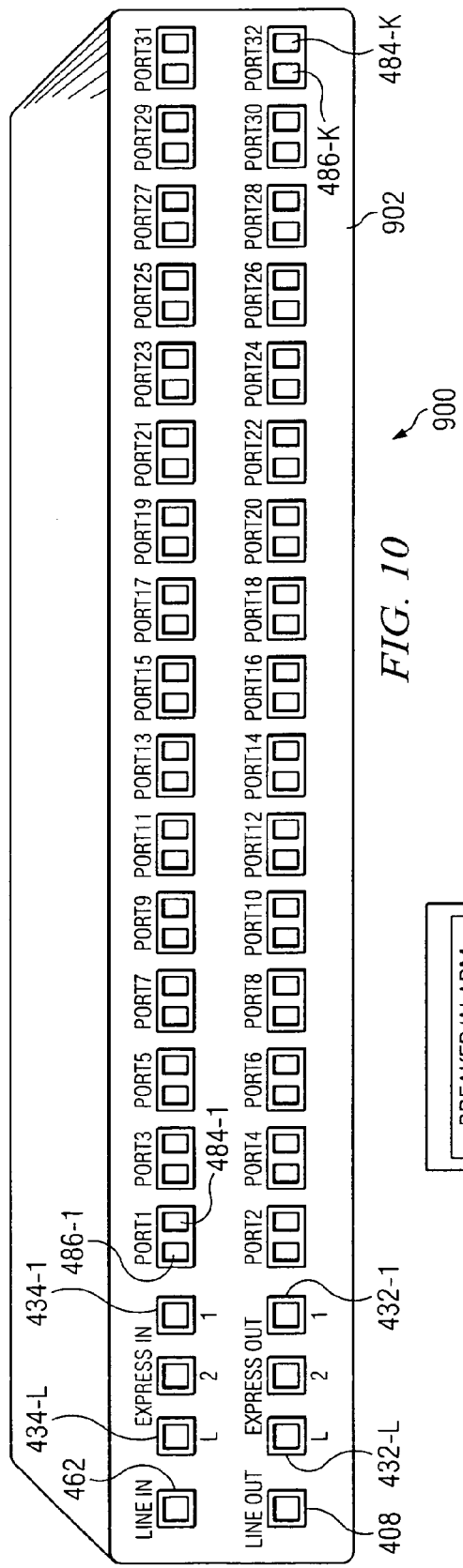
FIG. 10 illustrates an enclosure for an add/drop node in an example embodiment of the present invention.

FIG. 10 illustrates an example enclosure 900 for any of system optics cards 450, 550, 750, 850, 950, or 1050. For example, system optics card 450 can be implemented as a single enclosure 900. Enclosure 900 includes an integrated patch panel 902 so that system input port 312 and system output port 328 of optical converter card 310 can be connected to one of Port Outputs 484-1 to 484-K and one of Port Inputs 486-1 to 486-K respectively of systems optics card 450. Line input port 462 and Line output port 408 are provided on integrated patch panel 902 for West Line Input signal 460 and West Line Output signal 406. Express In port 434 and Express Out port 432 are also provided on integrated patch panel 902. Additional Express In ports 434-1 to 434-L and Express Out ports 432-1 and 432-L may be provided on integrated patch panel 902 to accommodate a configuration similar to system optics card 750. Enclosure 900 provides a small form factor optical shelf with an integrated patch panel. Other than the optical connections to and from the optical converters, the optical connections to and from the line outputs and inputs, and the express optical connections, cabling within an optical add/drop node is completely integrated within enclosure 900.

Figure 11:
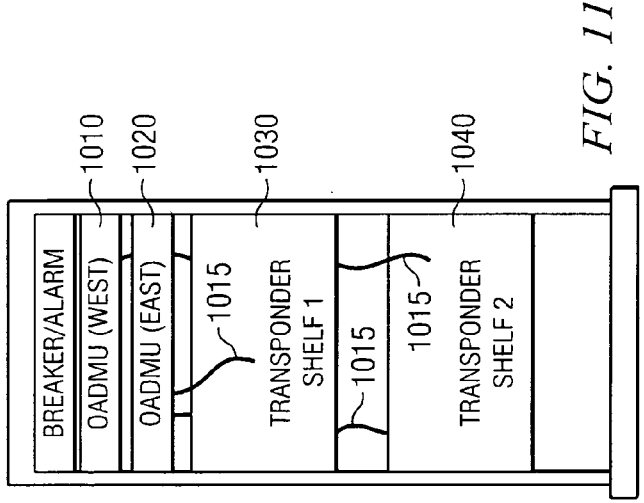
FIG. 11 illustrates add/drop units implemented in a rack system according to an example embodiment of the present invention.

FIG. 11 illustrates that two enclosures 900 can be implemented in a rack system 1000. One enclosure 1010 can be used for managing optical signals entering from or exiting to, for example, West Side 298 and another enclosure 1020 can be used for managing optical signals entering from or exiting to, for example, East Side 299. Multiple optical converter cards 310 can be implemented in port shelves 1030 and 1040. Port shelf 1030 may hold optical converter cards 310 managing signals entering from or exiting to West optical processing Side enclosure 1010. Port shelf 1040 can hold optical converter cards 310 managing signals entering from or exiting to East optical processing Side enclosure 1020. Alternatively, optical converter cards for both East optical processing Side enclosure 1020 and West optical processing Side enclosure 1010 can be placed in a single common port shelf. Optical fiber cables 1015 may be connected from integrated patch panel 902 of both enclosures 1010 and 1020 to appropriate optical converter cards in port shelves 1030 and 1040. Optical fiber cables 1015 may also be connected between the Express In port of enclosure 1010 and the Express Out port of enclosure 1020 and between the Express Out port of enclosure 1010 and the Express In port of enclosure 1020. The only other external cabling associated with rack system 1000 would be the cabling to the client devices and the line input and output cabling to each enclosure 1010 and 1020.

FIG. 12 shows an example flow process 1100 outlining operation of a system optics card. Upon receipt of a line input signal at block 1110, a determination is made at block 1120 as to whether any optical supervisory channels are included in the signal stream. If so, optical supervisory channels are extracted and processed at block 1130. After optical supervisory channel determination, the line input signal is amplified at block 1140. At block 1150, channels of the line input signal stream are identified for dropping, feedback, or pass through. At block 1160, channels to be dropped or for feedback are provided to an appropriate Port Output for processing by an optical converter card. Channels to be passed through are provided to an appropriate Express Out port at block 1170.

Figure 13:
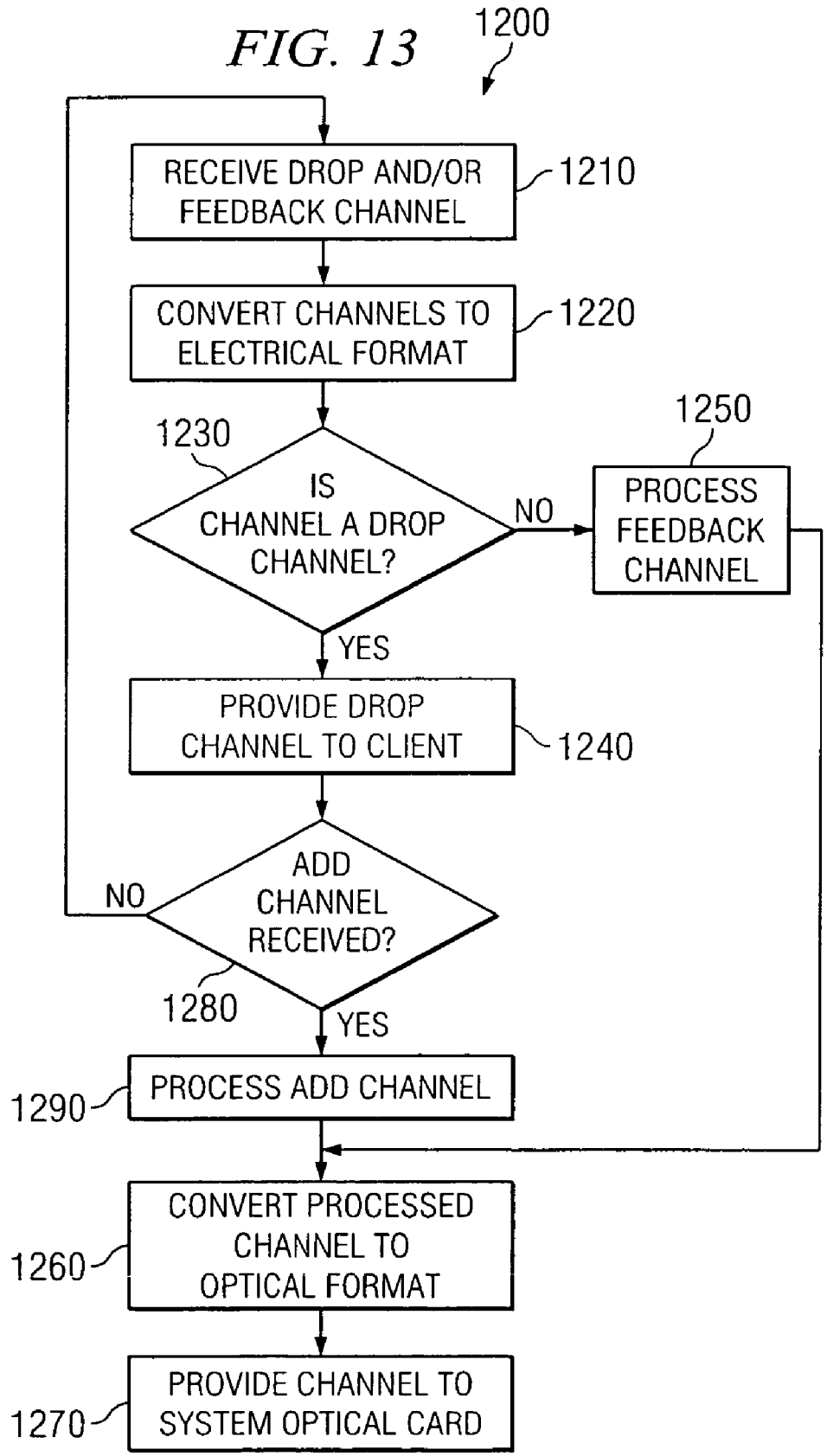
FIG. 13 shows an example flow process outlining operation of an optical converter card according to an example embodiment of the present invention.

FIG. 13 shows an example flow process 1200 outlining operation of an optical converter card. Process begins at block 1210 where drop and/or feedback channels are received. The channels are converted to electrical format at block 1220. A determination is made at block 1230 as to whether the channel received is a drop channel. If so, the drop channel is provided to the client device at block 1240. If not, the feedback channel is processed at block 1250. The process feedback channel is converted to optical format at block 1260. The feedback channel is then returned to the system optics card at block 1270. Process 1200 also determines at block 1280 whether any channels to be added have been received from a client device. If not, process 1200 will continue to look for receipt of any add, drop, and feedback channels. When an add channel has been received, appropriate processing is performed on the add channel at block 1290. The add channel is then converted to optical format at block 1260 and then provided to the system optics card at block 1270.

FIG. 14 shows an example flow process 1300 outlining further operation of a system optics card. At block 1310 channels are received from another system optics card through an Express In port. Client channels to be added are received at block 1320 from optical converter cards at Port Inputs. These channels are then multiplexed together at block 1330. The combined channels are amplified at block 1340. At block 1350, a determination is made as to whether any optical supervisory channels are to be included. If so, optical supervisory channels are inserted into the combined channel signal stream at block 1360. After this determination is processed, the channel signal stream is provided to a line output port for transport at block 1370.

System optics cards 450, 550, 750, 850, 950, and 1050 may be built to order according to desired configurations. For example, amplifiers 476 and 496 within system optics card 450 may be designed for short haul, long haul, and ultra long reach applications in order to provide amplifiers of differing strengths, such as for metropolitan and regional implementations. Moreover, add and drop filters 480 and 490 in system optics card 450 may be of different and variable types to support colored add and drop ports that are associated with a single wavelength and colorless add and drop ports that can be associated with any wavelength. A flexible DWDM system constructed using the components and features described herein provides cost efficiency through the elimination of redundant components found in prior art systems that use multiple circuit boards containing multiple copies of controller interfaces, power supplies, and monitoring circuitry. A costly backplane and its associated connections is also eliminated through the use of a system optics card built on a single printed circuit board. Due to the high level of integration in the enclosure, few external connections are required to install an operating system. System installation becomes simple and straight forward while also providing a flexibility to expand communication capability.

In the foregoing description, the invention is described with reference to specific example embodiments thereof. It will, however, be evident that various modifications and changes may be made thereto without departing from the broader spirit and scope of the present invention. For example, embodiments of the present invention may be provided as a computer program product, or software, that may include a machine-readable medium having stored thereon instructions. Further, a machine-readable medium may be used to program a computer system or other electronic device and the readable medium may include, but is not limited to, floppy diskettes, optical disks, CD-ROMs, magneto-optical disks, ROMs, RAMs, EPROMs, EEPROMs, magnetic or optical cards, flash memory, or other type of media/machine-readable medium suitable for storing electronic instructions. The specification and drawings are accordingly to be regarded in an illustrative rather than in a restrictive sense.

What is claimed is:

1. An apparatus for managing an optical signal, comprising:
   a first optical converter card operable to provide information to and receive information from a first client device;
   a first system optics card operable to transport information over a first optical transport link, the system optics card operable to receive information over a second optical transport link, the first system optics card operable to identify network channels on the second optical transport link destined for the first client device, the first system optics card operable to provide the identified network channels to the first optical converter card for delivery to the first client device, the first system optics card operable to receive client channels from the first optical converter card generated by the first client device, the first system optics card operable to transport the client channels of the first client device over the first optical transport link, wherein the first system optics card includes a plurality of express output ports to provide channels to a plurality of other system optics cards, wherein the first system optics card includes a plurality of express input ports to receive channels from a plurality of other system optics cards.

2. The apparatus of claim 1, further comprising:
a second optical converter card operable to provide information to and receive information from a second client device;
a second system optics card operable to transport information over a third optical transport link, the second system optics card operable to receive information over a fourth optical transport link, the second system optics card operable to identify network channels on the fourth optical transport link destined for the second client device, the second system optics card operable to provide the identified network channels to the second optical converter card for delivery to the second client device, the second system optics card operable to receive client channels from the second optical converter card generated by the second client device, the second system optics card operable to transport the client channels of the second client device over the third optical transport link.

3. The apparatus of claim 2, wherein network channels not destined for the first client device are provided by the first system optics card to the second system optics card for transport over the third optical transport link.

4. The apparatus of claim 2, wherein network channels not destined for the second client device are provided by the second system optics card to the first system optics card for transport over the first optical transport link.

5. The apparatus of claim 2 wherein a channel received over the second optical transport link can be provided to the first client device, the first optical converter for feedback over the first optical transport link, and the second system optics card for transport over the third optical transport link.

6. The apparatus of claim 1, wherein the first system optics card is operable to provide a feedback channel from the second optical transport link to the first optical converter card, the first optical converter card operable to process the feedback channel and provide the processed feedback channel to the first system optics card, the first system optics card operable to transport the processed feedback channel over the first optical transport link.

7. The apparatus of claim 1, wherein the first system optics card includes an optical supervisory channel processor operable to process information carried in a control channel on the second optical transport link.

8. The apparatus of claim 1, wherein the first system optics card is operable to multiplex a plurality of channels onto the first optical transport link generated by a plurality of client devices associated with a plurality of optical converter cards.

9. The apparatus of claim 1, wherein the first system optics card includes components that share a common power supply, power monitor, and processor.

10. The apparatus of claim 1, wherein the first system optics card provides an input amplifier having either a low gain or a high gain for respective short span and long span optical signal transport.

11. A node for managing an optical signal, comprising:
a first optical processing side incorporated on a single circuit card and operable to transport channels over a first optical transport link and receive channels from a second optical transport link, the first optical processing side operable to provide channels received over the second optical transport link to a first group of client interfaces and receive channels from the first group of client interfaces for transport over the first optical transport link;
a second optical processing side incorporated on a single circuit card and operable to transport channels over a third optical transport link and receive channels from a fourth optical transport link, the second optical processing side operable to provide channels received over the fourth optical transport link to a second group of client interfaces and receive channels from the second group of client interfaces for transport over the third optical transport link;
wherein the first optical processing side and the second optical processing side are operable to couple the first optical transport link to the fourth optical transport link to allow channels to pass through the second optical processing side to the first optical processing side, the first optical processing side and the second optical processing side are operable to couple the second optical transport link to the third optical transport link to allow channels to pass through the first optical processing side to the second optical processing side, wherein the first optical processing side includes a plurality of express output ports to provide channels to a plurality of other optical processing sides, wherein the first optical processing side includes a plurality of express input ports to receive channels from a plurality of other optical processing sides.

12. The node of claim 11, further comprising:
a third optical processing side incorporated on a single circuit card and operable to transport channels over a fifth optical transport link and receive channels from a sixth optical transport link, the third optical processing side operable to provide channels received over the sixth optical transport link to a third group of client interfaces and receive channels from the third group of client interfaces for transport over the fifth optical transport link;
wherein the first optical processing side and the third optical processing side are operable to couple the first optical transport link to the sixth optical transport link to allow channels to pass through the third optical processing side to the first optical processing side, the first optical processing side and the third optical processing side are operable to couple the second optical transport link to the fifth optical transport link to allow channels to pass through the first optical processing side to the third optical processing side;
wherein the third optical processing side and the second optical processing side are operable to couple the fifth optical transport link to the fourth optical transport link to allow channels to pass through the second optical processing side to the third optical processing side, the third optical processing side and the second optical processing side are operable to couple the sixth optical transport link to the third optical transport link to allow channels to pass through the third optical processing side to the second optical processing side.

13. The node of claim 11, wherein the first optical processing side is operable to provide a feedback channel received from the second optical transport link to the first optical transport link.

14. The node of claim 11, wherein the first and second optical processing sides are incorporated in separate enclosures, each enclosure having an integrated patch panel to facilitate optical fiber connections between enclosures and between the enclosures and the first and second groups of client interfaces.

15. The node of claim 11, wherein the first and second groups of client interfaces are provided on individual optical converter cards, each individual optical converter card being associated with a unique client.

16. A method for managing an optical signal, comprising:
receiving a plurality of optical channels in an optical channel stream over an optical transport link;
identifying an optical supervisory channel in the optical channel stream;
amplifying the plurality of optical channels in the optical channel stream;
determining a destination for each optical channel in the optical channel stream;
providing certain optical channels destined for client processing or feedback processing to appropriate ones of a plurality of client port outputs; and
providing certain optical channels destined for pass through processing to appropriate ones of a plurality of express output ports.

17. The method of claim 16, further comprising:
after identifying an optical supervisory channel in the optical channel stream, extracting the optical supervisory channel from the optical channel stream.

18. The method of claim 17, further comprising:
monitoring powers of optical channels in the optical channel stream.

19. The method of claim 18, further comprising:
controlling an amount of amplification based on monitoring powers of optical channels.

20. The method of claim 16, wherein at least one client port output is operable to handle optical channels at a fixed wavelength.

21. The method of claim 16, wherein at least one client port output is operable to handle optical channels at any wavelength.

22. The method of claim 16, wherein an amount of amplification provided to the optical channel stream is based on a length of the optical transport link.

23. A method for managing an optical signal, comprising:
enabling reception of certain optical channels for pass-through processing from appropriate ones of a plurality of express input ports;
enabling reception of certain other optical channels from client processing or feedback processing via appropriate ones of a plurality of client port inputs;
combining the optical channels in an optical channel stream;
amplifying the optical channels in the optical channel stream;
identifying an optical supervisory channels;
inserting the optical supervisory channels into the optical channel stream; and
providing the optical channel stream to a line output port.

24. The method of claim 23, wherein at least one client port input is operable to handle optical channels at a fixed wavelength.

25. The method of claim 23, wherein at least one client port input is operable to handle optical channels at any wavelength.

26. The method of claim 23, wherein an amount of amplification provided to the optical channel stream is based on a length of the optical transport link.

* * * * *

UNITED STATES PATENT AND TRADEMARK OFFICE
CERTIFICATE OF CORRECTION

| | | |
|---|---|---|
| PATENT NO. | : 7,630,634 B1 | Page 1 of 1 |
| APPLICATION NO. | : 11/319338 | |
| DATED | : December 8, 2009 | |
| INVENTOR(S) | : Mark E. Boduch | |

It is certified that error appears in the above-identified patent and that said Letters Patent is hereby corrected as shown below:

Title Page of patent, in column 1, (73), delete "Tellab" and insert -- Tellabs --.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,630,634 B1
APPLICATION NO. : 11/319338
DATED : December 8, 2009
INVENTOR(S) : Mark E. Boduch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Second Day of November, 2010

David J. Kappos
*Director of the United States Patent and Trademark Office*